(12) United States Patent     (10) Patent No.: US 8,675,105 B2
Lansel et al.     (45) Date of Patent: Mar. 18, 2014

(54) LEARNING OF IMAGE PROCESSING PIPELINE FOR DIGITAL IMAGING DEVICES

(75) Inventors: Steven P Lansel, East Palo Alto, CA (US); Brian A. Wandell, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 148 days.

(21) Appl. No.: 13/486,925

(22) Filed: Jun. 1, 2012

(65) Prior Publication Data

US 2012/0307116 A1    Dec. 6, 2012

Related U.S. Application Data

(60) Provisional application No. 61/492,326, filed on Jun. 1, 2011.

(51) Int. Cl.
| | |
|---|---|
| *H04N 9/04* | (2006.01) |
| *H04N 7/01* | (2006.01) |
| *H04N 11/22* | (2006.01) |
| *G06K 9/36* | (2006.01) |
| *G06K 9/34* | (2006.01) |

(52) U.S. Cl.
USPC ........... 348/273; 348/441; 382/280; 382/159; 382/167

(58) Field of Classification Search
CPC .......... H04N 5/23229; H04N 5/23232; H04N 5/2625; H04N 5/2353; H04N 5/35509; H04N 5/3559

USPC .................. 348/441–459, 273; 375/240–241; 382/162, 167, 199, 205–275, 299, 300
See application file for complete search history.

(56) References Cited

U.S. PATENT DOCUMENTS

| | | | |
|---|---|---|---|
| 7,072,508 B2 | 7/2006 | Dance | |
| 7,079,705 B2* | 7/2006 | Zhang et al. | 382/280 |
| 7,548,264 B2 | 6/2009 | Mitsunaga et al. | |
| 7,675,551 B1 | 3/2010 | Zhou | |
| 8,442,309 B2* | 5/2013 | Ranganathan | 382/159 |
| 8,520,945 B2* | 8/2013 | Lee et al. | 382/167 |
| 2010/0080451 A1 | 4/2010 | Nagano | |

* cited by examiner

*Primary Examiner* — Twyler Haskins
*Assistant Examiner* — Padma Haliyur
(74) *Attorney, Agent, or Firm* — Lumen Patent Firm

(57) ABSTRACT

A learning technique is provided that learns how to process images by exploiting the spatial and spectral correlations inherent in image data to process and enhance images. Using a training set of input and desired output images, regression coefficients are learned that are optimal for a predefined estimation function that estimates the values at a pixel of the desired output image using a collection of similarly located pixels in the input image. Application of the learned regression coefficients is fast, robust to noise, adapts to the particulars of a dataset, and generalizes to a large variety of applications. The invention enables the use of image sensors with novel color filter array designs that offer expanded capabilities beyond existing sensors and take advantage of typical high pixel counts.

20 Claims, 16 Drawing Sheets

| | | | | | | | | | | | |
|---|---|---|---|---|---|---|---|---|---|---|---|
| R | G | R | G | R | G | | R | G | R | G | R | G |
| G | B | G | B | G | B | | W | B | W | B | W | B |
| R | G | R | G | R | G | | R | G | R | G | R | G |
| G | B | G | B | G | B | | W | B | W | B | W | B |
| R | G | R | G | R | G | | R | G | R | G | R | G |
| G | B | G | B | G | B | | W | B | W | B | W | B |

A                                    B

| | | | | | | | | | | | |
|---|---|---|---|---|---|---|---|---|---|---|---|
| R | C | R | C | R | C | | E | R | E | R | E | R |
| B | Y | B | Y | B | Y | | S | *y* | S | *y* | S | *y* |
| G | P | G | P | G | P | | O | *p* | O | *p* | O | *p* |
| R | C | R | C | R | C | | E | R | E | R | E | R |
| B | Y | B | B | Y | B | | S | *y* | S | *y* | S | *y* |
| G | P | G | P | G | P | | O | *p* | O | *p* | O | *p* |

LEARNING OF IMAGE PROCESSING PIPELINE FOR DIGITAL IMAGING DEVICES

CROSS-REFERENCE TO RELATED APPLICATIONS

This application claims priority from U.S. Provisional Patent Application 61/492,326 filed Jun. 1, 2011, which is incorporated herein by reference.

FIELD OF THE INVENTION

This invention relates to color image processing methods, devices and systems.

BACKGROUND OF THE INVENTION

The number of pixels on modern digital cameras has rapidly grown in the past few years. Cameras today typically have such high megapixel counts that they far exceed the resolution of existing displays. For example, more than 10 high-definition 720p displays are required in order to view an image from a 10 megapixel camera without downsampling. Diffraction and aberrations from the camera's optics blur the image at the sensor, which limits the effectiveness of high spatial sampling. Instead of simply increasing spatial resolution, the large number of pixels offer a possibility to improve other aspects of photographs. Possible advances include increased sensitivity for low light photography, dynamic range expansion for scenes with bright and dark regions, and improved color accuracy. The present invention addresses at least such some of these advances.

SUMMARY OF THE INVENTION

The present invention provides an image processor for processing an input image to an output image. In one embodiment, the image processor has an image input device for reading an input image. The input image has a color filter array (CFA) mosaic structure. A single colorband is measured at each of the pixels of the input image and the spatial arrangement of these colorbands forms a regular pattern throughout the image. A storage device is used for containing a set of learned regression coefficients for a predefined estimation function to estimate output colorbands at image pixels. Each set of learned regression coefficients is defined for a collection of nearby pixels for each of the image pixels. A collection of nearby pixels refers to a fixed predefined collection (or patch) of pixels that generally (but does not have to) is centered at the pixel of the input image that is processed. Typically the collection or patch is square but could also take other shapes. The image processor further has a pixel processing module for processing each of the pixels of the input image. To process the input image to an output image, the pixel processor: (i) obtains the collection of nearby pixels for each of the pixels in the input image, (ii) selects learned regression coefficients from the stored learned regression coefficients based on the position of the pixel in the color filter array mosaic structure and based on a calculation using the collection of nearby pixels in the input image, and (iii) applies the learned regression coefficients and the predefined estimation function to the pixels in the input image. In this embodiment, the output image does not have a color filter array (CFA) mosaic structure, and the estimated colorbands at the output image pixels could be different or the same in number or spectral sensitivity from the colorbands of the input image. In one variation, the output image contains for each pixel values for a specified number of colorbands.

In another embodiment, the image processor has an image input device for reading an input image. A storage device is used for containing a set of learned regression coefficients for a predefined estimation function for estimating output colorbands at image pixels. In this embodiment, each set of learned regression coefficients is defined for a primary collection of nearby pixels for each of the image pixels. A pixel processing module is used for processing each of the pixels of the input image. To process the input image to an output image, the pixel processor: (i) applies a set of predefined global filters to the input image, (ii) obtains the primary collection of nearby pixels of the input image for the pixel, (iii) selects learned regression coefficients from the stored learned regression coefficients based on a secondary collection of nearby pixels from the result of applying the global filters, and (iv) applies the learned regression coefficients and the predefined estimation function to the input pixels.

In yet another embodiment, the image processor has an image input device for reading an input image. A storage device is used for containing a set of learned regression coefficients for a predefined estimation function for estimating output colorbands at image pixels of the input image. Each set of learned regression coefficients is defined for a collection of nearby pixels for each of the image pixels. A pixel processor module is used for processing each of the pixels of the input image, whereby the pixel processor obtains the collection of nearby pixels for a pixel. To process the input image to an output image, the pixel processor: (i) reorders the collection of nearby pixels, (ii) selects learned regression coefficients from the stored learned regression coefficients based on the reordered collection of nearby pixels, and (iii) applies the learned regression coefficients and the estimation function to the pixels. In this embodiment, one operates on images without a CFA mosaic structure, exploiting the symmetry in the collection of pixels before learning is applied. Assuming the collection of pixels is symmetric across the vertical, horizontal, and diagonal directions, mirroring can be applied along these dimensions to orient the patch in a particular direction. For example, one may mirror patches across the vertical direction as needed so that the left side of each patch has a higher average than the right side. By doing this in each of 3 directions, patches that differ in a total of 8 different orientations can be processed together as if they are the same patch.

The embodiments of this invention could have one or more of the following additional features.

The learned regression coefficients are obtained from a learning process based on a learning regression method using a set of training images having pairs of input and desired output images.

The learned regression coefficients are obtained using a Wiener filter.

The estimation function is a linear function and learned regression coefficients represent an optimal convolution filter for the respective collection of nearby pixels for each of the image pixels.

The pixel processor module, before applying said predefined estimation function, includes a module for reordering the collection of nearby pixels in said input image based on values of said pixels in said input image. The reordering module could further have a module for implementing rotating and/or mirroring of values of the pixels in the input image.

The selection of stored learned regression coefficients is determined by calculation of luminance, noise level, degree of aberration, position in image, amount of saturation, presence of erroneous pixels, amount of contrast, average value in each colorband, or any combination thereof.

The traditional method of using heuristics and assumptions about images to design image processing algorithms generally is very difficult and provides suboptimal results. The invented learning method exploits the statistical spatial and spectral correlations between the input and desired output images to easily learn optimal regression coefficients that quickly generate high quality output images. By appropriately choosing the desired output images, the resultant learned coefficients automatically may perform any combination of demosaicking, denoising, transforming color, deblurring, or other desired image manipulations in a single optimized calculation.

Learning also enables the resultant algorithms to be optimized for particular applications and datasets, which is not possible with general processing algorithms. By exploiting the particular properties of datasets that are inherent in some imaging tasks, which do not exist in sets of natural images, the output images can have significantly higher quality.

The generality of the invention allows the resultant image processing algorithm to efficiently process input images with any type of CFA structure. High quality output images are created by exploiting the subtle and complex correlations that exist between the input image's CFA structure and the desired output image. The invention enables rapid design and testing of new CFAs by automatically generating the required processing for any such image sensor.

BRIEF DESCRIPTION OF THE DRAWINGS

FIGS. 1A-D show Bayer and novel CFAs with expanded capabilities according exemplary embodiments of the present invention. (A) Bayer pattern, (B) RGBW CFA with translucent pixel for low light, (C) six-band CFA for improved color or multispectral imaging, and (D) six-band CFA for potential medical use. R=red, G=green, B=blue, W=white, C=cyan, Y=yellow 1, P=pink 1, E=emerald, S=salmon, y=yellow 2, O=orange, p=pink 2.

Figure 4:
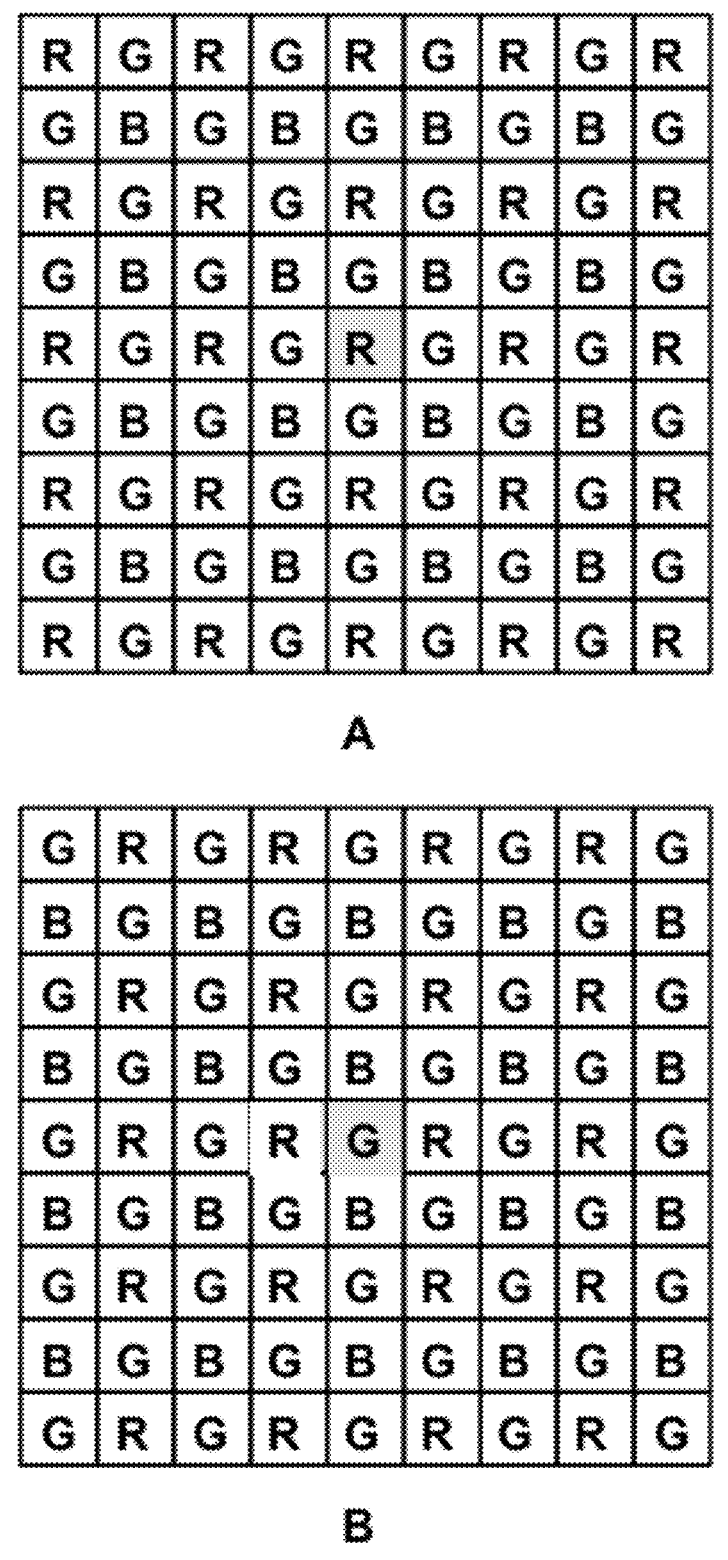
Figure 4:
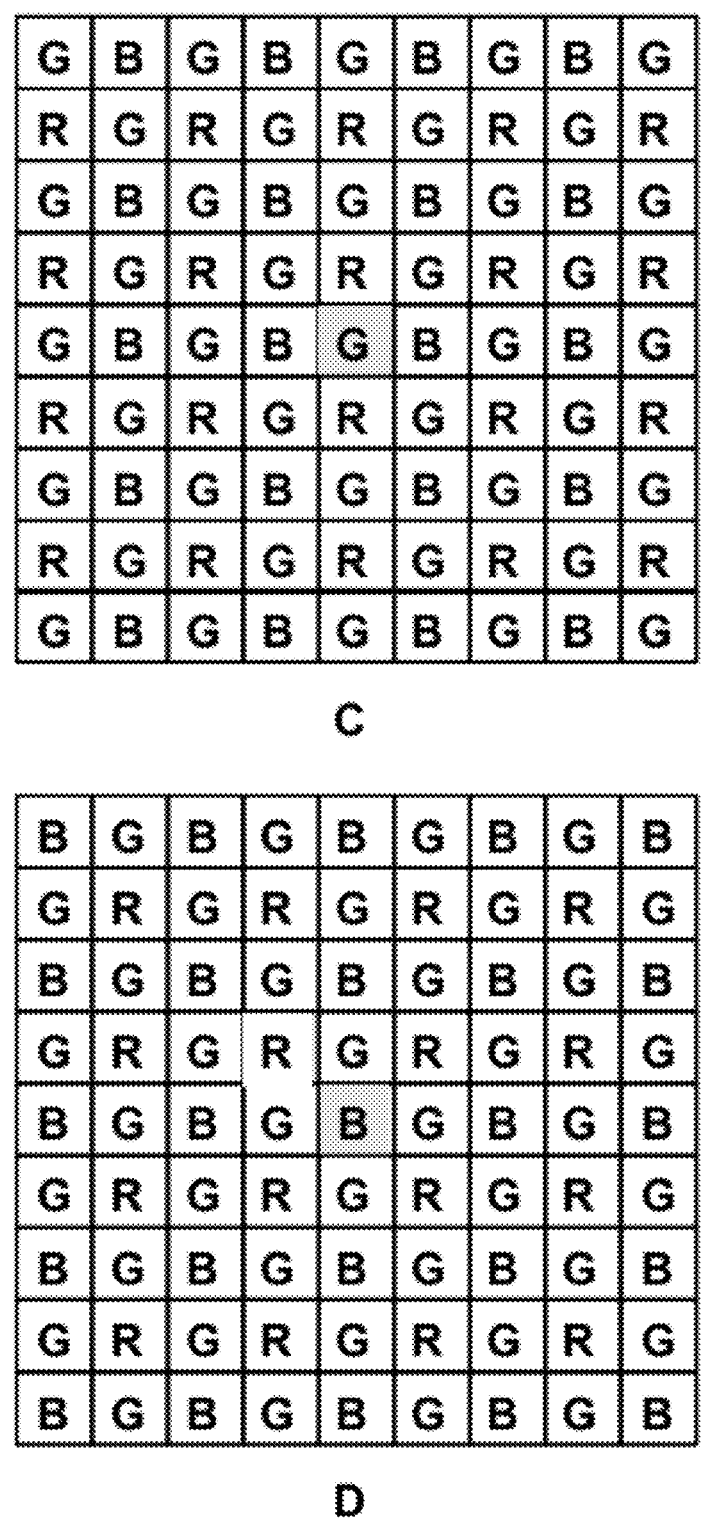

FIGS. 4A-D show according to exemplary embodiments of the invention patch types for Bayer CFA. (A) R-patch, (B) G1-patch, (C) G2-patch, and (D) B-patch. The pixel with grey fill denotes the center pixel. Patch size can differ from 9×9 pixels as shown here.

DETAILED DESCRIPTION

Figure 2:
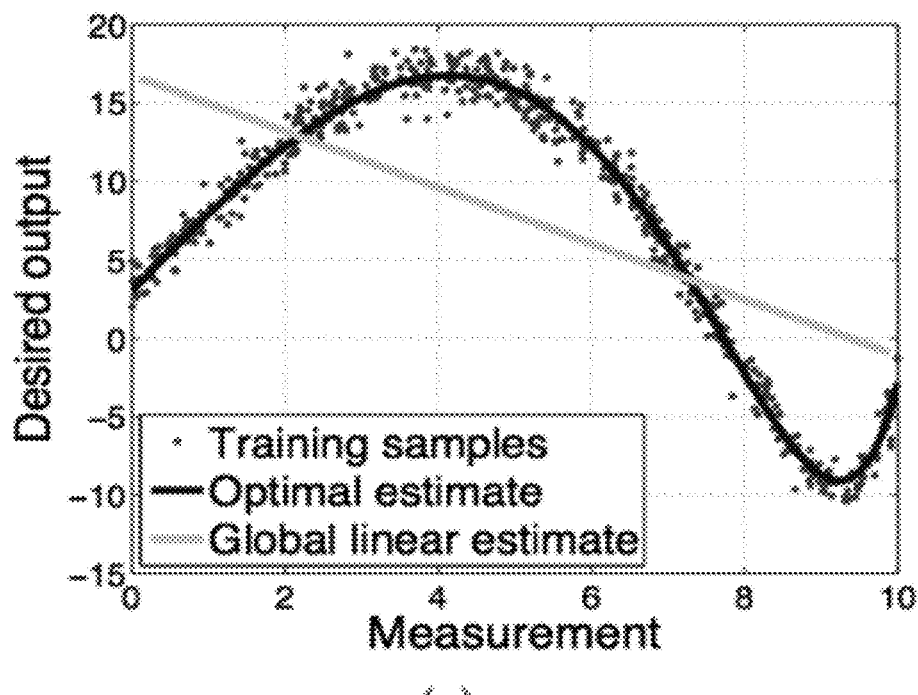
FIGS. 2A-B show according to exemplary embodiments of the invention $L^3$ demonstration on one dimensional data. (A) Global linear estimate derived from 500 training samples with σ=1 and measurements uniformly distributed over [0,10]. (B) $L^3$ estimator derived over each of eight smaller intervals.
Figure 2:
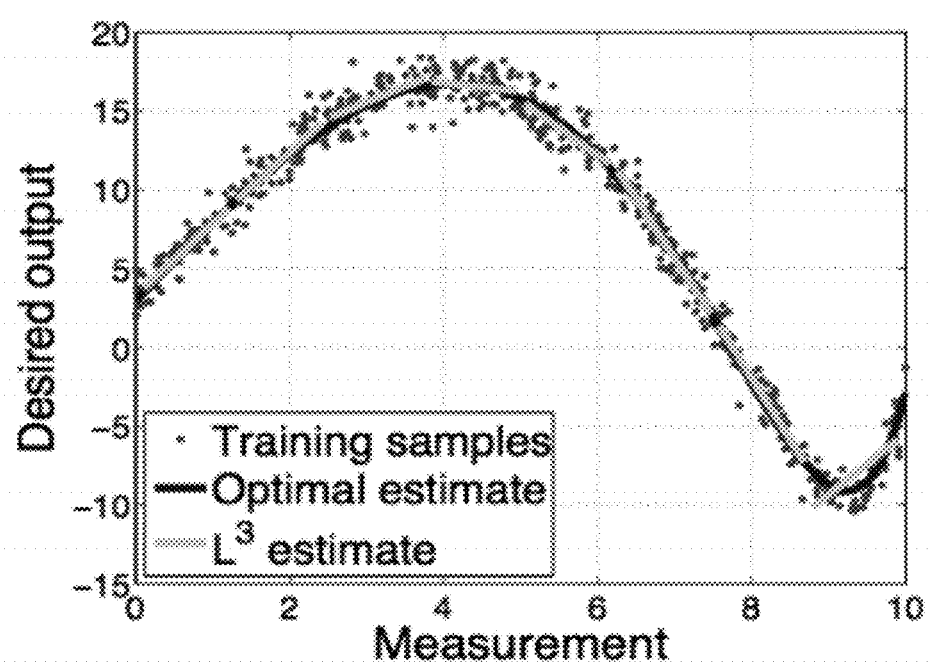

Advances such as increased sensitivity for low light photography, dynamic range expansion for scenes with bright and dark regions, and improved color accuracy are possible by altering the color filter array (CFA) of sensors in modern cameras. The CFA is a set of optical filters in almost all digital cameras that overlay each photosensitive site on the sensor so each pixel measures only a particular color of light. The camera's sensitivity to light for each type of pixel in the CFA can be described by the camera's quantum efficiency for each channel. These functions give the probability that a photon with a given wavelength will excite an electron-hole pair in the sensor. Generated electrons in each pixel of the sensor are collected and counted to determine the amount of light at each pixel in that pixel's colorband.

The Bayer CFA shown in FIG. 1A is in almost all cameras today. FIG. 1B shows a CFA where half of the green pixels from the Bayer CFA are replaced with white pixels. The white pixels have transparent filters so their sensitivity is given by the sensor's silicon. This increased sensitivity enables very low light photography. Similar CFAs with white or more sensitive pixels have been considered.

The additional pixels could be used, not just to improve photographs for human viewers, but to measure spectral features that cannot be directly observed by the human visual system. Human vision is enabled by the retina, a thin layer at the back of the eye that contains photoreceptors responsible for human vision. There are millions of cells called cones that react to the incoming light. There are three types of cones. Each has a different sensitivity to light, which can be described as spectral curves over the visible range. Since there are only three types of cones in the human retina, human vision has a limited ability to differentiate between objects with similar spectra.

There are a number of optical imaging devices such as application specific cameras, microscopes, and endoscopes that have similar technologies to consumer cameras, but are interested in light beyond its perception by people. Multispectral or hyperspectral imaging deals with trying to observe spectrums from a scene, not simply the three color components that can be observed by the human visual system. The spectrums can also include wavelengths outside the visible range of 400-700 nm such as near infrared wavelengths of 700-1100 nm. The additional information in the spectrum may greatly simplify the task of classifying or detecting objects that appear to have similar colors to a human observer.

Multispectral applications include remote sensing, computer vision, displays and printers, art, food safety and inspection, and medical applications including microscopy, fluorescence imaging, pathology, diagnosis, dermatology, and telemedicine.

There are a large number of specialized devices for capturing multispectral images. Unfortunately all are very expensive and require a long acquisition time, which restricts one to stationary scenes without moving objects such as people. Typically these devices can simultaneously acquire two dimensions and sequentially scan the third dimension needed for multispectral imaging.

A camera with a CFA featuring a number of colorbands such as in FIG. 1C, offers the possibility of cheaply estimating multispectral scenes using a single acquisition that can occur very quickly. In addition to the typical red, green, and blue pixels, the CFA has cyan, magenta, and yellow pixels.

The six band sensor can be used in a multispectral camera to estimate the amount of light for any wavelength in each pixel. Development of such a multispectral camera should not cost much more than a regular consumer digital camera, but could be used in many specialized applications.

Observing six colorbands allows improved color estimation over typical sensors with three bands. Since the cyan, magenta, and yellow filters transmit more light than the red, green, and blue filters, this CFA also may have increased sensitivity in low light.

The CFA in FIG. 1D shows a modified six-band design that may be used specifically in medical cameras that operate inside the body for superior performance for tissue classification. The sensor is designed to more heavily measure the red part of the spectrum, since internal tissue typically is more reflective at the red end of the spectrum.

These CFAs are only a few of the possible new CFAs that could be developed. There is great potential to exploit spectral properties in specific applications of the future by designing CFAs for particular datasets. For imaging sensors that are designed to operate only in specific environments such as in the body, a factory, or in a computer vision system, the sensor and processing can be optimized for the very narrow set of scenes that the sensor will be used to capture.

Image Processing Pipeline Challenges for New CFAs

A major challenge with new CFAs is the difficulty of designing the image processing pipeline, which is a series of calculations that converts the output from the sensor into a desirable image for display or storage. The following are the calculations that are part of a typical image processing pipeline. All pipelines generally have some form of each of these calculations although the order may be changed or additional algorithms may be introduced.

Defect correction accounts for errors in the sensor such as dead or hot pixels.

Lens shading adjusts the intensity of regions of the image to account for the decreased exposure near the outside of the image.

Demosaicking estimates the unobserved colorbands at each pixel to generate a full color image from a CFA image.

Denoising attempts to remove any noise while still preserving the underlying content of the image.

Color transform converts from the color space measured by the sensor into a desired standard color space. For images that are to replicate human perception of the original scene, the output color space typically is a linear combination of the XYZ color matching functions.

Deblurring/Sharpening attempts to restore details that may have been blurred by the camera to create a more pleasing image with defined edges.

Gamma transform applies an exponential to the linear intensity values so the output image can be displayed properly and comply with standard color formats such as sRGB.

Compression reduces the file size while minimizing the perceptual change in the image.

The demosaicking, denoising, and color transform are the only parts of the pipeline that critically depend on the particular CFA. Although a large number of algorithms have been proposed for each of these three calculations, most do not apply to new CFA designs. Also certain assumptions that are the basis of many image processing algorithms for standard RGB based images fail to generalize to arbitrarily defined color spaces.

Demosaicking new CFAs is challenging because spatial and spectral correlations in the images must be exploited for successful algorithms. When estimating values at a particular pixel, nearby measurements are often from different colorbands while pixels of the same color are farther. The colorbands may overlap and have important correlations that should be exploited to properly demosaic the image.

Similarly, denoising is challenging because of the difficulty in separating the signal from the noise that exists throughout the different colorbands. The strength of the noise differs between the colorbands based on the amount of light in each band. Also the noise in each colorband differs across pixels because one band was measured while others were estimated when demosaicking.

For Bayer cameras, the color transform is typically a linear combination of the estimated RGB values to the output XYZ values at each pixel. Often the same transformation is used for all pixels regardless of content or noise level. This approach can seriously fail for certain CFAs or output color spaces especially if the spectral filters overlap or there are significant differences in noise levels among the channels.

To illustrate the difficulty of processing new CFAs, consider measuring with the RGBW CFA shown in FIG. 1B and estimating XYZ under the following conditions.

Very low light—Red, green, and blue measurements are very noisy and unreliable, but the white measurements are much less noisy. Since it is impossible to accurately estimate rich colors from these measurements, the color transform should rely heavily on the white channel, and the output images should be close to grayscale.

Dim light—Red, green, and blue measurements are noisy, and the white measurements contain little noise. The white channel can assist in demosaicking and denoising by identifying structures in the scene such as edges. All four channels should contribute to the output image and be in the color transform.

Bright light—All measurements contain little noise although the white channel may saturate and become unreliable. The white measurements are not helpful in the color transformation because the red, green, and blue sensitivities are designed to approximately lie in the subspace spanned by X Y Z. The color transform depends only on the red, green, and blue channels.

Clearly the demosaicking, denoising, and color transformation must adapt to the peculiarities of this particular CFA and change significantly over different light levels. This illustrates the difficulty of creating processing pipelines for new CFAs.

Local, Linear, Learned Pipeline

The traditional method of using heuristics and assumptions about images to design the above stages of the image processing pipeline is inefficient and very difficult for many new CFA designs. A learning method is presented herein that automatically calculates filters and necessary parameters from a training set of data, so the resultant pipeline is easily found. The approach of the present invention estimates the output image in one fast calculation, instead of the separate calculations commonly required for demosaicking, denoising, and transforming color. The subtle correlations between the different channels of the CFA and the desired output color space are learned from the training set. Learning also enables the resultant algorithms to be optimized for particular applications and datasets, which in general was impossible with previous algorithms. Computational costs are kept to a minimum by requiring only linear calculations and scalar comparisons in the pipeline.

Reflectance Estimation from Few Spectral Measurements

With a method for processing any possible CFA, the next important question is how to design the CFA for a particular application. The bands should be designed to adequately measure the wavelengths of interest, while minimizing sensor cost and noise while maintaining high spatial resolution. To understand the design tradeoffs, one must study the problem of estimating spectra from a small number of measurements like the different channels of a camera. It is much easier to understand the tradeoffs of the spectral sensitivities by initially ignoring the spatial dimensions of the camera. Described infra is the problem of estimating an object's reflectance using measurements from a camera with known spectral sensitivity under a known illuminant. An object's reflectance is a function of wavelength that describes the percent of incident light on the object that is reflected. The reflectance determines the appearance and color of the object. A local, linear, learned approach for reflectance estimation is presented as well as its advantages.

Local, Linear, and Learned Concepts

The approach and algorithms presented herein for image estimation are referred to as $L^3$. This stands for Local, Linear, and Learned, and highlights unique features of the method. In general, the $L^3$ approach is a way to leverage training data to estimate an unknown vector based on a vector of possibly noisy measurements. For image estimation, the CFA measurements surrounding a pixel are used to estimate a small number of spectral bands at the center pixel. For reflectance estimation, the measurements are a small number of spectral bands of light coming from an object that are used to estimate the object's reflectance. Following are unique features of the approach.

Local refers to the adaptive nature of the estimation. This is in contrast to global approaches where all estimates are formed in an identical manner. Such global algorithms fail when the relationship between the measurements and desired outputs changes significantly based on the observed measurement values. To perform the adaption, the measurement space is divided into clusters. Typically the clusters are designed so similar objects or image features are grouped together. The estimates for all measurements that fall in the same cluster are calculated in an identical manner and are optimized for the members of that cluster.

Linear emphasizes that almost all the algorithm's calculations are linear, hence very fast to compute. Computational requirements are very important when operating on modern images and videos that contain millions of pixels. Many published image processing algorithms have very high computational requirements that may be too expensive for many applications. For a set of measurements, once the proper cluster is identified, which requires only linear calculations and comparisons, a pre-computed linear filter is applied to form the estimates. Under certain assumptions, the Wiener filter is the optimal linear filter for each cluster and is robust to the expected noise level of the measurements. In particular, assume the signal and noise are independent in a given cluster. Due to the signal-dependent nature of Poisson shot noise, this is generally not true. But it is assumed since it simplifies the calculation and is reasonably valid when the training data in the cluster are similar.

Learned means that the estimation is driven by extracting statistics from a training set of data. Since estimation is generally an underdetermined problem, statistics from the datasets are needed to guide the estimates. Instead of relying on heuristics and general knowledge about images, which is common in image processing although challenging for non-RGB images, machine learning techniques are used to optimize the processing over a training set. The clustering method is learned from the training set. Then, the Wiener filter is calculated for each cluster, which achieves the least error over the training data in that cluster. As a result of the learning, the $L^3$ approach automatically generates estimates for a particular application. For applications where the reflectances or images are more constrained than typical scenes captured by consumers, the specialized algorithms may have significantly improved performance.

Illustrative Example

Figure 3:
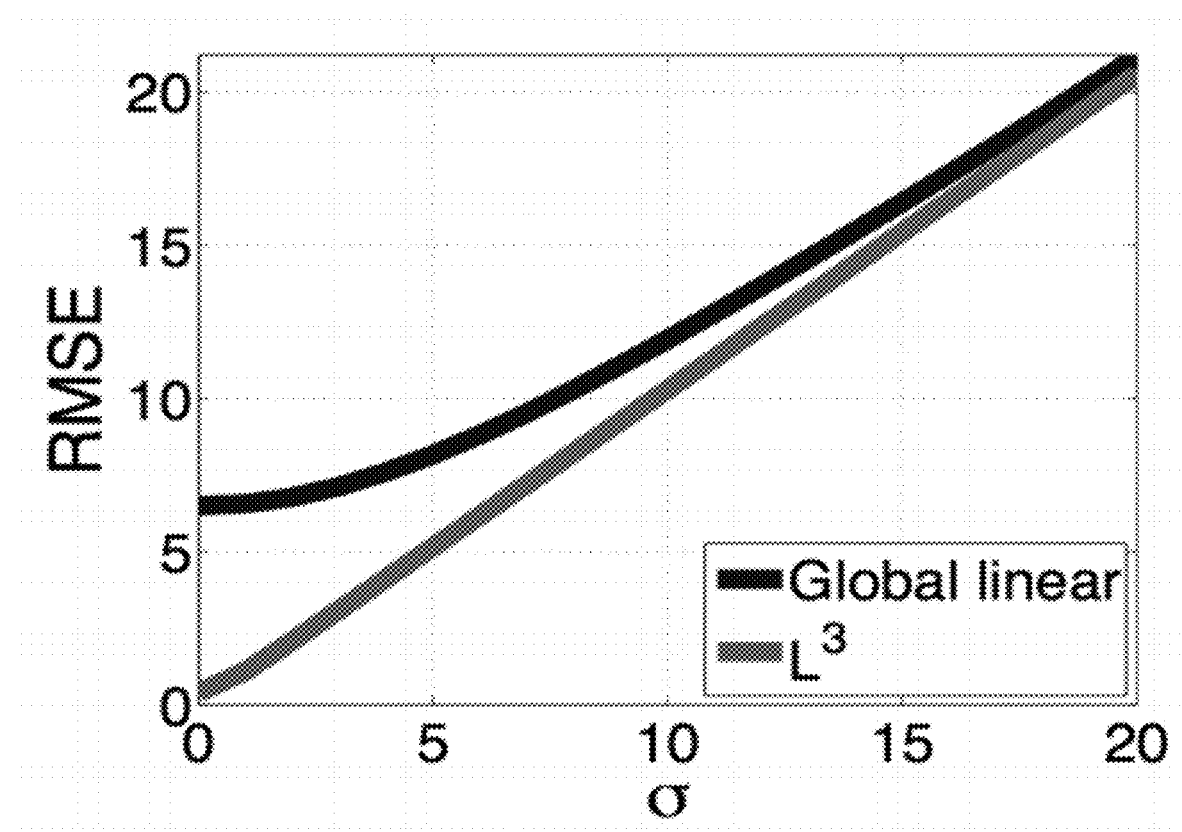
FIG. 3 shows according to an exemplary embodiment of the invention that $L^3$ is most valuable if relation between measurements and outputs is strong. Root mean squared error (RMSE) of global and local linear estimators for the underlying function and localization shown in FIGS. 2A-B with 500 similarly generated training points. Error was calculated over 10,000 randomly generated test points.

Consider the fabricated problem shown in FIG. 3. The scenario is very simple where both the measurement and output are scalars. Measurements are taken uniformly over the interval [0,10]. The corresponding desired output for each measurement differs from a fixed function of the measurement by a Gaussian random variable with mean 0 and a constant standard deviation, $\sigma$. Therefore, the optimal estimate is this fixed function. The Gaussian random variable represents the deviation in the desired output that cannot be predicted from the measurement.

A similar unavoidable error occurs in image and reflectance estimation, because only limited measurements are available that do not perfectly predict the underlying signal. Note this unpredictability is different from measurement noise, which is absent from this example.

The optimal global linear (specifically affine) estimator derived from the training samples is shown in FIG. 2A. Notice that the global linear estimate is a poor fit for the data since the underlying function is very nonlinear. FIG. 2B shows the result of dividing the interval [0,10] into eight intervals of equal width and deriving the optimal linear (affine) estimate based on the training samples that fall in each interval. Notice that the local linear estimate closely approximates the optimal estimate except in the [8.75, 10] measurement interval, because the optimal estimate varies too quickly in that interval. Now the estimator has enough freedom to closely track the optimal estimate. To make an estimate for a single measurement, first determine the interval that contains the measurement. The pre-calculated filter for that interval is then obtained from memory and applied. Kernel regression provides an alternate approach to estimate the underlying function and results in a continuous estimator. However, when performing an estimate one must access the original data and perform more computations. The local linear approach was chosen for its minimal computation and memory requirements when being applied, which are necessary for many modern imaging applications.

FIG. 3 shows how unpredictability in the data effects the performance of the global and $L^3$ estimates. When $\sigma=0$, there is a deterministic relationship between the measurement and the desired output. In this case, the RMSE directly reflects the estimator's bias or inability to approximate the underlying function. As $\sigma$ increases, the relationship between the measurement and the desired output becomes weaker, which results in an unavoidable error for any estimator. Although the $L^3$ estimator is almost optimal for this example, when $\sigma$ is large the error due to the unpredictability of the data dominates compared to the difference in bias between the global linear and $L^3$ estimators. As a result, the relative improvement of the $L^3$ estimator over the global linear estimator shrinks as $\sigma$ increases. Measurement noise has a similar impact by degrading the performance of both estimators and shrinking the relative improvement of localization.

Therefore, the $L^3$ estimator is most valuable compared to the global linear estimator for datasets where there is a strong nonlinear relationship between the measurements and desired outputs and little measurement noise. Restricting the training dataset to only a subset of the possible objects or scenes in the world results in decreased uncertainty. Such constrained datasets exist for specific applications where the objects and scene are more confined than in general photography.

Expansion to Multiple Dimensions

For estimation using multiple measurements, the division into local clusters and the linear estimation is performed in the higher dimensional space. If there are multiple outputs desired from the estimation, the clustering is performed once in the measurement space, and then separate linear estimators are calculated and applied for each desired output.

The method of dividing the measurement space into local clusters is an important design consideration. For computational reasons, clustering is performed hierarchically so that the number of clusters grows exponentially with the number of required branching operations. The division of a cluster into two smaller clusters involves a linear inner product and a scalar comparison, which are computationally efficient. The clusters are designed to have a strong linear relationship between the measurements and the desired outputs. If the linear relationship is not strong enough for a cluster, further subdividing the cluster may be helpful. However, there is a risk of having too many clusters. In addition to increased computation and memory, the wrong cluster may be identified for a particular measurement due to the noise. In addition, there is a need for each cluster to contain enough training data to avoid overfitting and generating regressions that may not perform well outside the training set.

Image Estimation

The following features are important to create an image processing pipeline that offers accurate estimation.

The pipeline must not demand too much computation or memory due to the large number of pixels in cameras today. Ideally the algorithm will require minimal computation and can expand in complexity as needed for increased performance.

The pipeline must apply to any CFA. The CFA can contain any number of colorbands with any spectral shape and any spatial arrangement. Without a general approach, the development of the pipeline is difficult for the particularities of any single CFA. With a general approach, rapid evaluation through simulation of new CFA designs is possible, which otherwise requires reinventing the pipeline each time.

The pipeline must allow output images to be in any color space. The color space can have any number of colorbands with any spectral shape. The output colorbands can be defined as an inner product between the incoming light and a sensitivity function that may have both positive and negative intervals.

The pipeline must be robust to measurement noise. It should allow for the differing noise levels caused by the variation from dark to bright scenes. Also it is important to recognize that there may be different noise levels across the color channels due to possible differences in overall sensitivity.

The pipeline should be customizable for a given application. Algorithms tuned to the particulars of specific datasets may offer improved performance over general imaging pipelines. This is especially important for cameras that will always be used for specific purposes where all imaged scenes are similar. In addition, the algorithm's task specialization may be valuable in consumer cameras if the particular type of scene can be determined. This may be possible through automatic scene detection or the user's input. For example, on many consumer digital cameras there exist pre-specified scene modes that the user can select, which could signal use of filters optimized for that scene type.

The pipeline should be simple and understandable so that it can be adjusted to effect a desired result in the output images. Existing pipelines often require a large number of successive calculations, which makes understanding and modifying the whole system challenging. By combining several of the calculations, a designer can view the resultant images and adjust a few parameters to create a desirable change in certain images or image regions.

The $L^3$ pipeline as an illustrative implementation of the present invention fulfills these design requirements by leveraging machine learning on training images to simultaneously perform in a single calculation the demosaicking, denoising, and color transform calculations from a traditional image processing pipeline. In one embodiment, the lens shading stage of the pipeline described supra is not initially included in the $L^3$ pipeline because it is not spatially shift-invariant. The gamma transform and compression calculations are also not included in the $L^3$ pipeline because they are highly nonlinear and easily performed in post-processing.

Example of Training Set and Generation Methods

To generate a learning algorithm for an image processing pipeline, one needs a high quality set of input images and the corresponding desired output images. The learned algorithm will try to estimate the output images as closely as possible. Perfect estimation is impossible due to noise and a non-deterministic relationship between the input and output images. Specifically, the training set consists of a collection of CFA measurements that contain little or no noise and the corresponding desired output, which may be calculated, designed, or measured. There is no need for the output images to be a scientifically accurate measurement of the scene if an altered image is preferable. For instance, camera manufacturers may adjust the appearance of certain colors such as the sky to make it more saturated, which might appeal to consumers.

There are a couple methods to generate the training data. One is computer simulations of known multispectral scenes based on basic properties of the camera. This has the advantage that there is no requirement for a physical camera prototype which can be expensive to build especially for novel CFAs. It is very simple to experiment with new camera designs in simulation, which enables fast optimization and testing without prototype cameras and a physical lab with calibrated test scenes.

An existing camera can be characterized by photographing standard test charts to obtain the simulation parameters. As long as the simulations statistically resemble measurements from the camera's sensor, output images from the learned pipeline will match the simulated outputs.

For an existing camera, one could alternatively photograph a scene with a known multispectral distribution and use the actual sensor measurements for training. This removes any error caused by a mismatch between the simulation and the existing device. The multispectral data from the scene could be measured using one of a number of sophisticated and often expensive pieces of scientific equipment.

Global Linear Pipeline

A global linear learned pipeline is one of the simplest pipelines to implement and requires minimal computation. The output estimates at each pixel are a fixed linear combination of the sensor measurements at and nearby the pixel, but do depend on the scene luminance. In this example, the pipeline introduced for a particular light level will be globally linear. However, the pipelines for different light levels could differ due to the differing SNRs.

The algorithms in some of the examples are spatially localized: values at each pixel in the final image are a function only of the sensor measurements at and nearby the pixel. This enables parallel processing. The existing implementation uses a square set of sensor measurements called a patch, which measures $\sqrt{m} \times \sqrt{m}$ pixels where $\sqrt{m}$ is odd. Since only the center pixel output values are estimated, the number of patches that must be processed equals the number of pixels in the image. There do not exist enough neighboring pixels to form a patch for pixels within $(\sqrt{m}-1)/2$ pixels of the outside of the image, so no outputs are calculated in this border region.

It is common to have a similar spatial localization in demosaicking algorithms. Such a property is uncommon in denoising because non-local regions of the image may contain similar structure that can be used to determine the underlying signal and remove noise. Although locally restricting the estimation ignores possible patterns or statistics in the sensor image that may be helpful in estimation, the restriction significantly reduces computation and memory requirements.

There are several different patch types depending on how the CFA pattern lines up with the patch. FIGS. 4A-D shows the four patch types for the Bayer CFA, which will initially be used to illustrate the algorithms. In general, there are as many patch types as pixels in the repeating block of the CFA pattern, 2×2 for the Bayer CFA. Each patch type is denoted by the color of its center pixel where the output color channels will be estimated.

In general, separate filters are learned for each patch type. For the Bayer CFA, the G1 and G2 patches differ only by a rotation. Under the assumption that there is no fundamental differences in the vertical and horizontal directions in images, the optimal filters for these patches will also be rotations of each other. This assumption is approximately true for cameras since photographing the same scene in landscape or portrait orientations performs this rotation. Exploiting this rotation reduces the number of filters trained and stored.

Let $y \in R^m$ be a vectorized sensor patch that is assumed to be noise-free. When testing, the measurements will be corrupted with noise $n \in R^m$ so $z=y+n$ is observed. Let $x \in R^o$ be the desired values of the $o$ output colorbands at the center pixel of the patch.

To form the training data, k patches are extracted at random from a set of training images. Let the columns of $Y \in R^{m \times k}$ and $X \in R^{o \times k}$ be a collection of the y and x vectors from each patch. Although Y is assumed to be noise-free for training, the filtering needs to be robust to measurement noise. Let $N \in R^{m \times k}$ be a random matrix representing measurement noise.

The linear estimator $W \in R^{o \times m}$ is desired that makes the estimate $\hat{X}=W(Y+N)$ most similar to X.

Generally m<k, so perfect estimation is not possible. Instead, the sum of the squares of the errors of the estimates is minimized. Specifically, minimize $|\hat{X}-X|_F^2$ where $|A|_F = \sqrt{\Sigma_{i,j} a_{i,j}^2}$ is the Frobenius norm. This corresponds to an optimal estimate as measured by mean squared error (MSE) or peak signal to noise ratio (PSNR). Unfortunately these metrics do not correspond well with perceptual errors, but are convenient for optimization.

For the Wiener filter derivation, a few assumptions are needed. To remove the signal dependence of the noise, N is assumed to be independent of X and Y, which may not be true in practice but is required for the Wiener filter. Instead the columns of N are assumed to be independent and identically distributed with mean 0 and autocorrelation $R_n$. The Wiener filter solves for the average noise expected over the dataset even though it will vary depending on the measurement at each pixel. This assumption is reasonable for low dynamic range scenes, but may be poor for high dynamic range scenes where there is a large variation in noise across the image.

Under these assumptions, the optimal linear filter is the Wiener filter, W, found by solving $W(YY^T+kR_n)=XY^T$. When applying the filter to a patch, the estimate of the output colorbands at the center pixel, $\hat{x} \in R^o$, is given by $\hat{x}=Wz$.

If there is no noise, denoising is automatically disabled to give a demosaicking algorithm using the optimal demosaicking filter, $W=XY^+$, where $Y^+$ is the Moore-Penrose pseudo-inverse.

Figure 5:
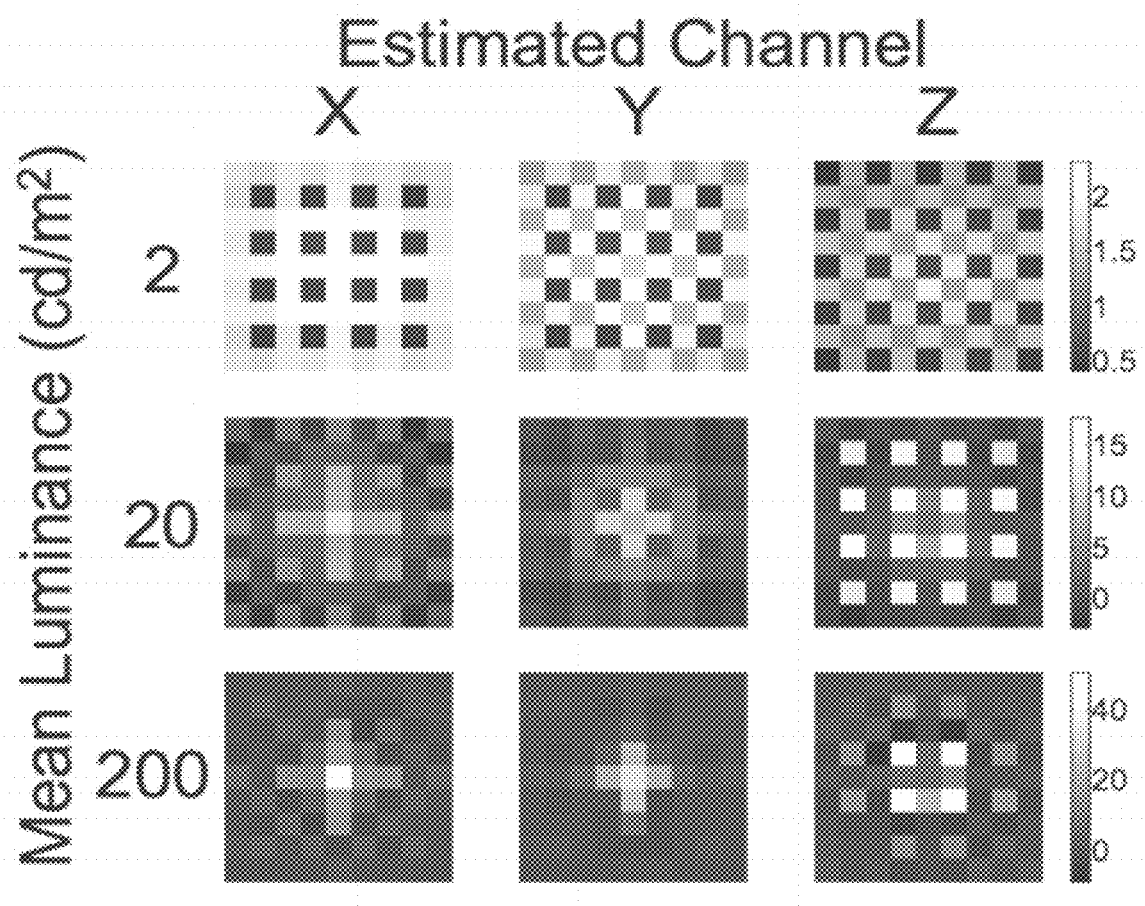
FIG. 5 shows according to an exemplary embodiment of the invention that optimal filters are more dispersed for darker scenes. Derived Wiener filters to estimate the X, Y, and Z channels at the center pixel of an R-patch. Each row of filters is scaled as shown on the right.

FIG. 5 shows the Wiener filters trained on some natural images. Each row of the W matrix is the filter required to estimate a certain color channel and is converted from a vector to its corresponding patch for display. To obtain the global linear estimate of the XYZ channels at the center of a patch, calculate the inner product between the patch and each of the three filters.

As a reference, $2 \text{ cd/m}^2$ is similar to a dim indoor scene or an outdoor scene 15 minutes after sunset with a clear sky. A brightly lit indoor scene or an outdoor scene at sunset under a cloudy sky is around $20 \text{ cd/m}^2$. Finally, $200 \text{ cd/m}^2$ is similar to the output from an LCD display or an outdoor scene at noon under a gray sky.

The filters in FIG. 5 have a number of interesting features. Compared to dim scenes, the filters for bright scenes are more centralized and have greater range of coefficients, which improves the filter's noise robustness. For bright illumination, the few pixels near the center of the patch are a good predictor of the desired channels because they have little noise. Also the signal is more likely to be the same in the pixels in the center instead of the outside of the patch. But as noise increases, it is risky to rely so much on the pixels at the center of the patch, so the other pixels are used more heavily. By spreading out the filters, the measurement noise can be smoothed away, however the signal is also blurred.

For the two brighter illumination levels, the patch's R, G, and B pixels have the largest coefficients for the X, Y, and Z channels, respectively. This occurs because these are the pairs with the most spectral overlap. For the darkest illumination, the total of the coefficients of the green channel are larger than the coefficients for the red or blue channels for each of the X, Y, and Z filters. The result is an image with dull colors, which causes a systematic color bias although reduces the risk of incorrectly estimating more saturated colors in the output image.

Notice that only for the two brighter illumination levels there are negative coefficients. Part of the estimates are from a weighted difference between the pixels at the center and along the edges. This helps cancel out the overall effect of colors that may not correlate well with the desired output channel but helps find any differences in intensity across the patch, which helps estimate the desired output channel. This difference is particularly sensitive to noise because subtracting two random variables results in a random variable with variance equal to the sum of the original random variables.

Figure 6:
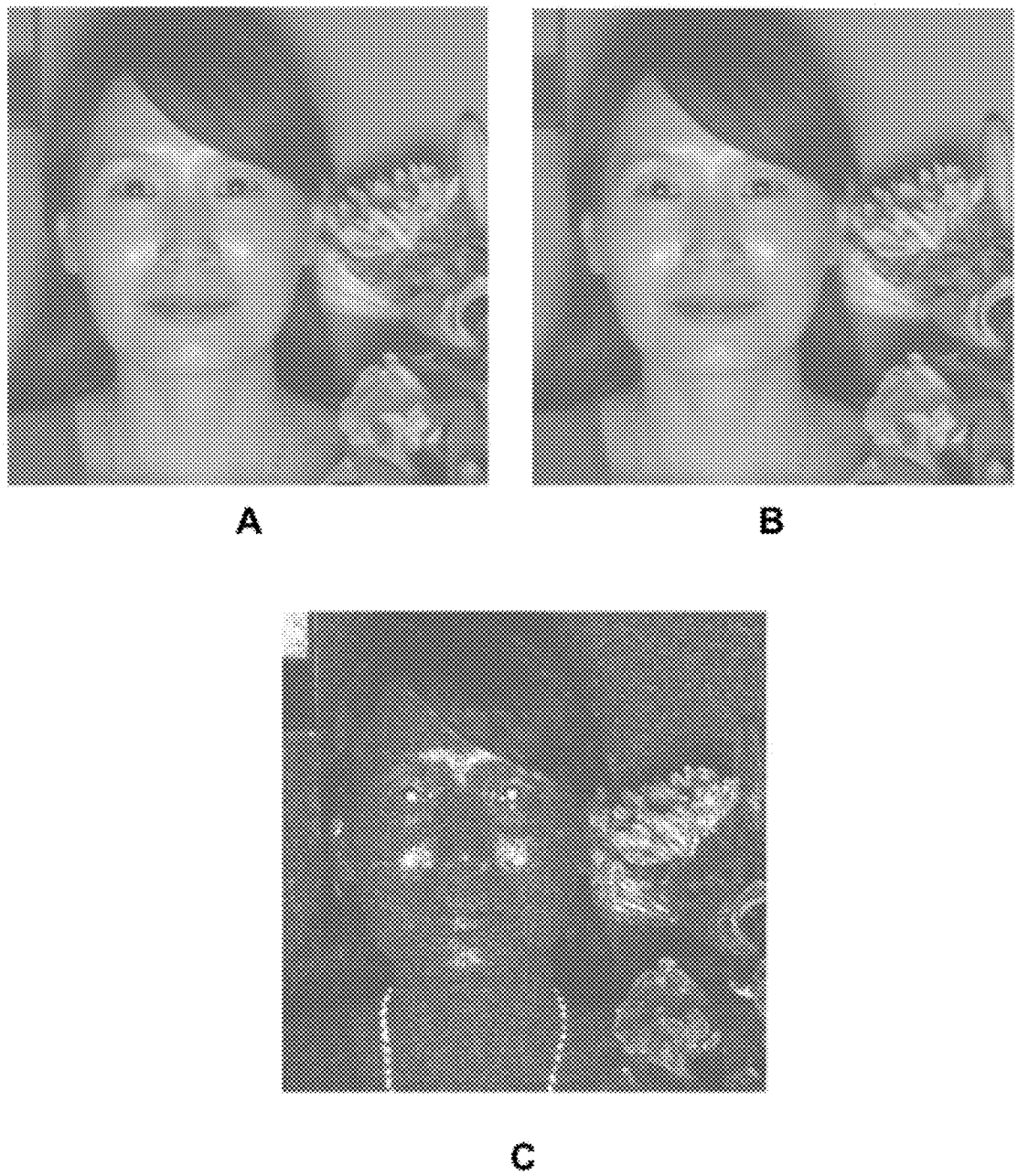
FIGS. 6A-C show according to exemplary embodiments of the invention how global linear estimation could perform well except near texture. (A) Ideal output image converted from XYZ to sRGB. (B) Result of global linear estimation using Bayer CFA with mean luminance of 500 cd/m² and 9×9 patch. Image was converted from XYZ to sRGB. (C) Difference between images (A) and (B). Gray value corresponds to mean over XYZ channels of absolute difference between the images at each pixel. The whitest point corresponds to errors of 10% or greater of the average value in the ideal XYZ image.

FIG. 6 illustrates the performance of the global linear estimation method for a bright scene with little noise. The training was performed on six similar portrait scenes. The method performs very well under such little noise and the difference between the ideal output and reconstruction is imperceptible with a Spatial CIELAB value of 0.49. The algorithm makes errors near sharp edges such as around the necklace or specular highlights in the skin and textured regions such as in the flowers. There also can be slight color bias for saturated colors like in the top-left of the image although this is due to the difficulty of estimating saturated colors using only three measured channels.

$L^3$ Pipeline

Figure 7:
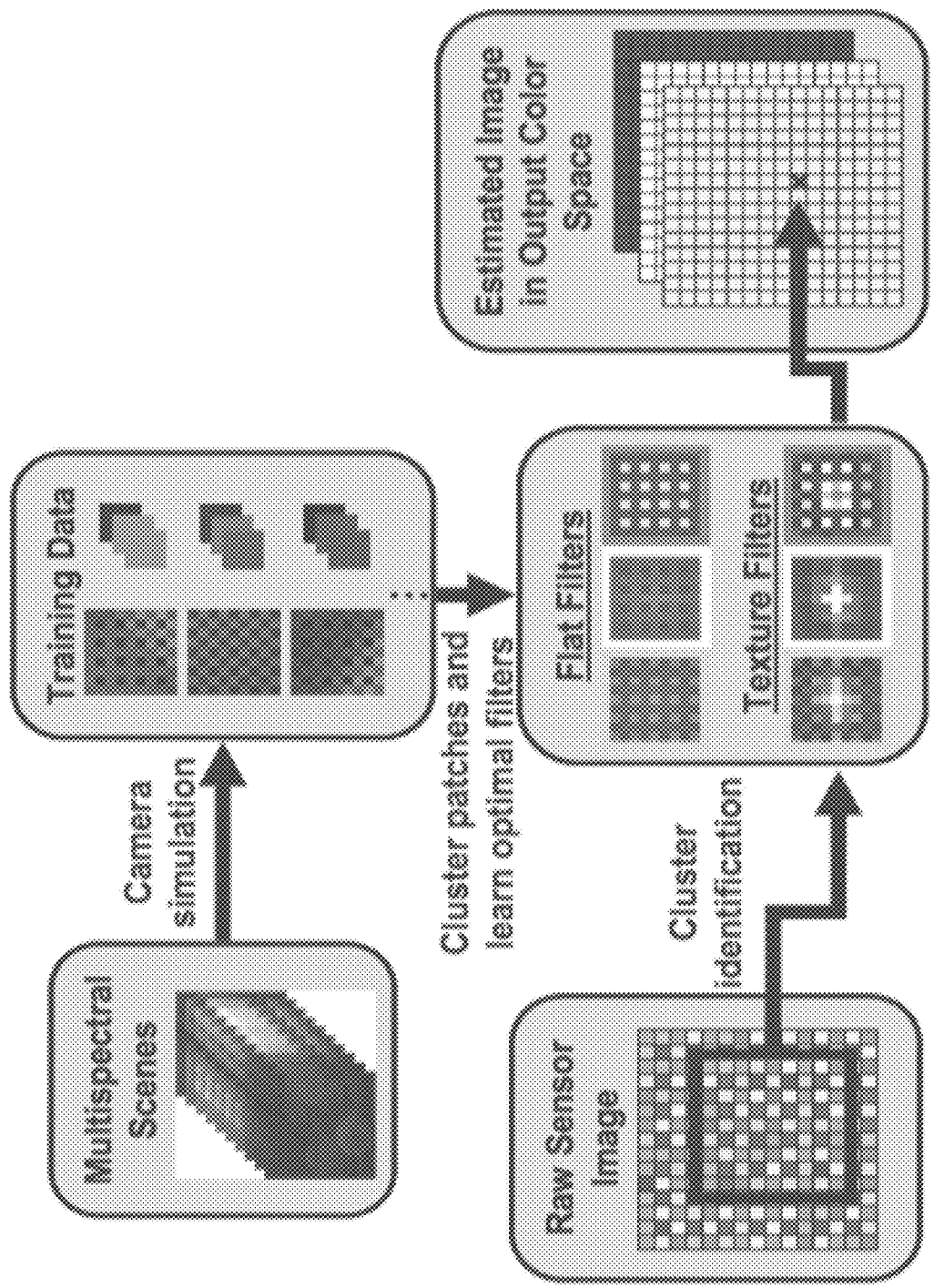
FIG. 7 shows according to an exemplary embodiment of the invention an overview of training and applying $L^3$ pipeline.

Since only a single set of filters are allowed in the global linear pipeline, the filters must balance the competing interests of averaging to reduce noise and attempting not to blur edges in the image. To overcome this limitation, the $L^3$ pipeline is introduced where a small set of Wiener filters are pre-computed and applied when appropriate to adapt to the local content of the image. The patches from the training data are organized into clusters of similar patches. For each cluster, the Wiener filter is found using just the patches in that cluster. If the clusters are designed well, the resultant filters are able to adapt to the particular properties of each cluster and differ between the clusters, which results in improved estimation. The clustering procedure and filters are derived from the training data once and stored. To apply the pipeline to a patch, the appropriate cluster is identified and the corresponding filters are accessed in memory and applied to give the estimate of the output image at the center pixel. FIG. 7 provides an overview of the $L^3$ pipeline.

Classification into Flat and Texture Patches

Figure 8:
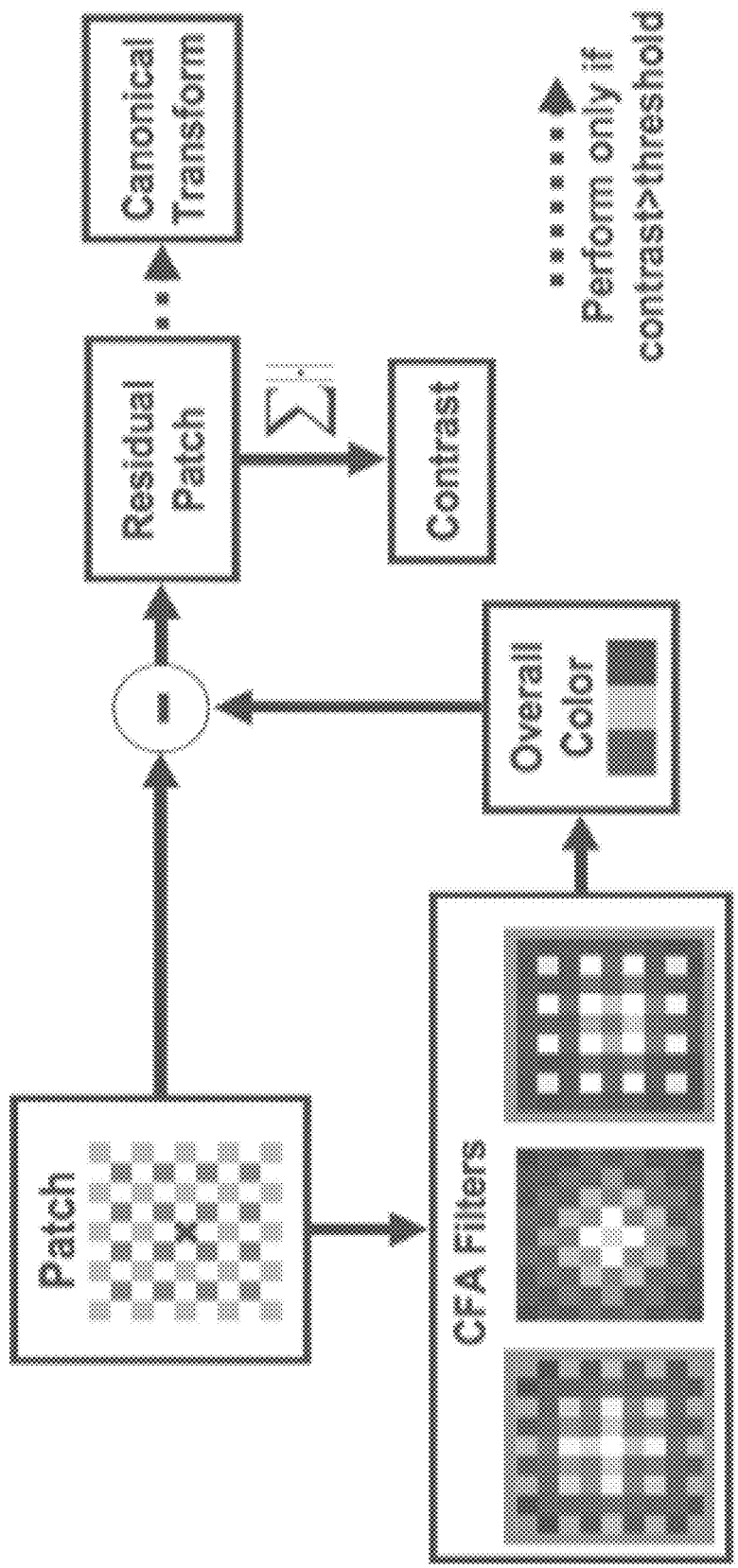
FIG. 8 shows according to an exemplary embodiment of the invention calculations for applying the $L^3$ pipeline. A patch is classified as flat or texture by calculating the contrast and comparing to a threshold. If the patch is texture, it is oriented before applying the texture filters. The CFA filters shown are optimized for 20 cd/m².

Since the largest errors caused by global linear filtering are near edges and textures, patches will be divided into two groups, flat and texture. Flat patches are relatively uniform areas of the image that contain only low spatial frequencies. Texture patches contain higher frequencies and appear as edges or texture. A diagram depicting the calculations of applying the $L^3$ pipeline is provided in FIG. 8.

To distinguish between flat and texture patches, global Wiener filters are calculated except the output color space that is solved for is instead the same as the CFA measurement bands (RGB for the Bayer pattern). These Wiener filters are referred to as the CFA filters and are given by $O \in R^{h \times m}$ where h is the number of colorbands in the CFA. The CFA filters estimate the values in the different CFA measurement bands at the patch's center pixel. This is called the overall color of the patch, denoted by $\hat{z} \in R^h$, and calculated as $\hat{z}=Oz$.

For each pixel in the patch, subtract the estimate that corresponds to that pixel's color. This results in a patch called the residual patch denoted by $z_0 \in R^m$ and given by $z_0=z-D\hat{z}$. Here $D \in \{0, 1\}^{m \times h}$ is a matrix that describes the CFA pattern in the patch where $D_{i,j}=1$ if and only if the pixel in entry i of z is the same color as entry j of $\hat{z}$. If the patch is perfectly flat meaning all measurements are equal in the different colorbands, the residual patch is identically 0. The amount that each value in the transformed patch deviates from 0 is a measure of the amount of texture in the patch. Therefore, the contrast of the patch is defined as $c=(\Sigma \|z_0\|)$. A patch is flat if $c \leq c^*$ and is texture if $c > c^*$ where $c^*$ is a predetermined threshold.

The threshold is chosen by simulating the noisy measurement process for the training patches and setting the threshold so a certain percentage of patches are classified as flat. This percentage is a design parameter of the algorithm. Since modern digital cameras tend to have a high pixel density, a large percentage of pixels can be considered flat but this may depend on the content of the training scenes. It is important to realize that neglecting noise by calculating the threshold using noise-free training patches results in a threshold that is too low to achieve the desired percentage of flat patches when testing. This is because noise increases the contrast for all patches so a higher threshold is required to achieve the same percentage.

Figure 9:
FIGS. 9A-B show according to exemplary embodiments of the invention how texture pixels could have large global linear estimation errors. (A) Classification of pixels into flat (black) and texture (white) patches. The threshold between flat and texture patches was set to classify 80% of the training patches as flat. (B) Error of global linear estimation from FIG. 6C.

FIG. 9A shows an example of the classification of flat and texture pixels. Notice the global linear pipeline results in small errors for flat pixels while the errors for texture patches tend to be higher as shown in FIG. 9B. Demosaicking and denoising errors are generally largest near edges and textures due to the difficulty of estimating the higher frequencies. The flat regions have relatively small errors because there is little risk of blurring the signal and so noise can be filtered out aggressively. For these reasons, the flat patches will simply be filtered by a Wiener filter specifically trained on the flat patches. But the texture patches will be further processed in an effort to reduce their error. Fortunately, a large majority of the pixels in an image are flat so calculation is still fast.

Canonical Orientation of Texture Patches

A common goal in demosaicking and denoising algorithms is to avoid averaging or filtering across edges because this will blur the edge. The texture patches often have an edge or gradient, however, these currently occur in any direction. No single filter for the texture patches can adapt to the orientation of the edge or gradient. The solution is to orient the patches so that the gradient is always in the same direction so a single optimal filter can be applied that takes advantage of the orientation.

Fortunately, CFA structures often have one or more axes of symmetry that can be exploited for the orientation. For CFA patterns with a 2×2 repeating pattern such as the Bayer and RGBW CFAs, each patch type has vertical and horizontal axes of symmetry. For the Bayer pattern, the red and green patches are also symmetric along either of the diagonals.

If the CFA pattern of a patch type is symmetric over a particular axis, mirroring the patch over the axis does not change the corresponding color of any of the pixels while keeping the center pixel in the same location. The ability to mirror the patches allows one to orient them so the gradient is in a particular direction. The patches are mirrored so that one side of each axis of symmetry will have a higher sum than the other side. Arbitrarily the left and top regions of each patch are chosen to have the higher value assuming vertical and horizontal axes of symmetry. Therefore, the oriented patches are always brighter on the left and top sides than the right and bottom sides. A Wiener filter is learned for and applied to the oriented texture patches, which can now take advantage of the orientation of the gradient across the patch.

Since the sides of the axes of symmetry that have a higher value is ignored, it is important to note that this is only advised when the information has no particular significance. Typically this is safe because the orientation of an image contains no interesting properties. There may be slight macroscale features that occur in images such as blue from sky appearing in the top of landscape images, but these features are relatively weak on the scale of the patches.

Figure 10:
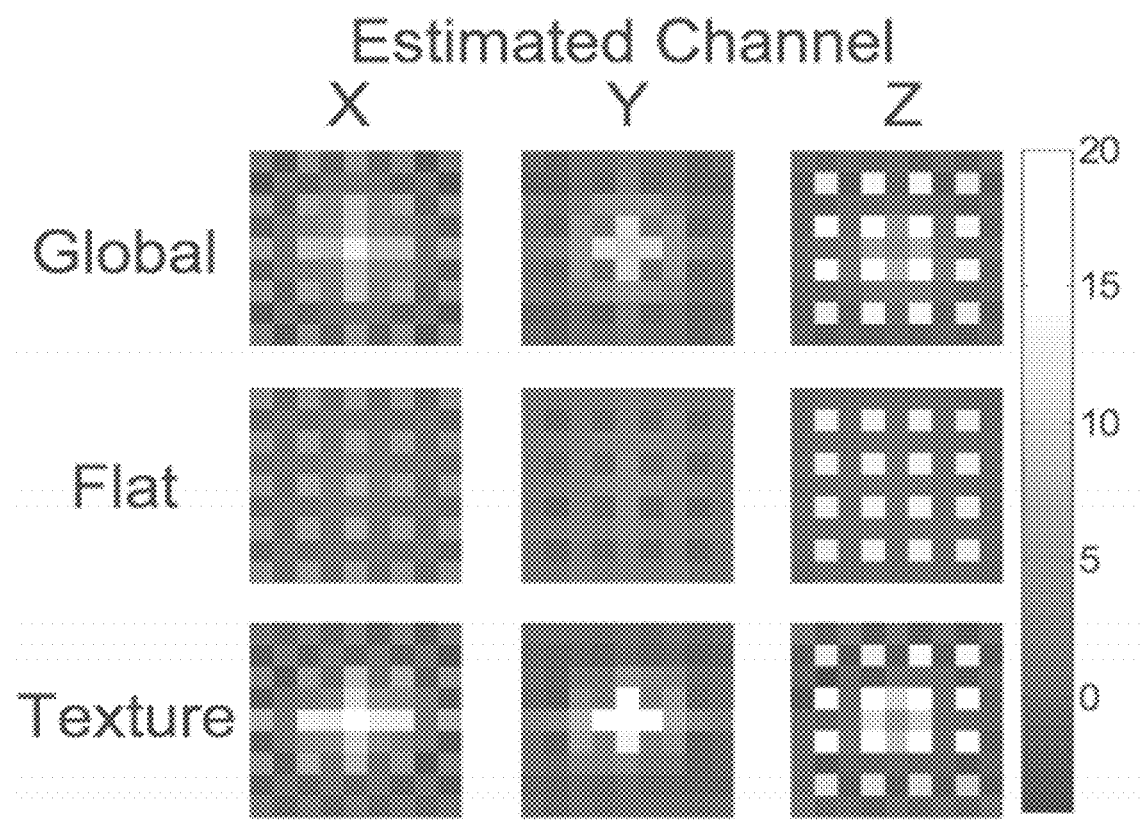
FIG. 10 shows according to an exemplary embodiment of the invention how learned global, flat, and texture filters could differ. Derived Wiener filters for estimating the X, Y, and Z channels at the center pixel in an R-patch for a scene with mean luminance of 20 cd/m². The threshold between flat and texture patches was set to classify 80% of the training patches as flat.

Wiener filters for the global, flat, and texture patches are provided in FIG. 10. The global filters are a compromise between the flat and texture filters. This is because the global filters optimize the overall squared error, which is largest for the texture patches although 80% of the patches are flat. The filters for flat patches are more dispersed in order to reduce noise by averaging with little risk of blurring the underlying signal. But filters for the texture patches must be more centrally weighted to avoid using measurements where the signal has changed such as across an edge. Also notice the global and flat filters are approximately symmetric, which is not true of the texture filters because they have been oriented.

Further Clustering of Texture Patches

Since texture pixels contain a majority of the processing errors, it is tempting to further process them by clustering and finding an optimal linear filter for each cluster. The hope is that the texture clusters can more accurately capture differences among the texture patches. If the learned filters for each of these clusters are significantly different, the overall estimation may be improved. However, if the filters are similar, little improvement can be expected from subdividing the texture clusters. Details for how the texture patches are further clustered are provided in the Appendix A.

Implementation of Flat and Texture Filters

Since the overall color is removed from a patch to give the residual patch during the flat/texture classification, it is more efficient to implement the flat and texture filters on the residual patch and overall color. The alternative is to either replicate the patch in memory before subtracting the overall color and apply the canonical transformation to both patches or convert the residual patch back to the original patch. To avoid this extra step, the flat and texture filters are instead converted to apply directly to the residual patch and overall color.

Let W be the flat or texture filter that generates the desired estimate by $\hat{x}=Wz$. The removal of the overall color to obtain the residual patch can be written as $$\begin{bmatrix} z_0 \\ \hat{z} \end{bmatrix} = \begin{bmatrix} I - DO \\ O \end{bmatrix} z$$

where $I \in R^{m \times m}$ is the identity. Let the matrix on the right side of the above equation be $A \in R^{(m+h) \times m}$. Since the columns of A are linearly independent, $A^+A=I$. Therefore, $\hat{x}=WA^+Az$. Let $\Psi \in R^{o \times (m+h)}$ where $\Psi=WA^+$ and $$\hat{x} = \Psi \begin{bmatrix} z_0 \\ \hat{z} \end{bmatrix}$$

The $\Psi$ filters produce the same estimates as the W filters but can be applied directly to the residual patch and overall color as desired. These are the filters that are stored and used for computation in the pipeline.

A pseudocode description of the $L^3$ pipeline is provided in Algorithm 1. The left, right, top, and bottom functions are the sum of the entries in the corresponding side of the patch excluding the center row or column. The functions mirrorv and mirrorh flip the patch over the vertical or horizontal axes of symmetry, respectively, which are assumed to exist in the pseudocode.

---

Algorithm 1 $L^3$ Processing Pipeline

---

Input: Vectorized patch from sensor, z; CFA filter, O; binary matrix describing CFA structure, D; contrast threshold, c*; tree height for texture clustering, t; texture branching filters, $B_n$; texture branching thresholds, $b_n$; filter for flat cluster $\Psi_f$; filters for each texture cluster leaf, $\Psi_{f,n}$ Output: Vector of estimated values at center pixel for each band in output color
    space, $\hat{x}$
    $\hat{z} \leftarrow Oz$
    $z_0 \leftarrow z - D\hat{z}$
    $c \leftarrow \Sigma(||z_0||)$
    if $c < c^*$ then
        return $\hat{x} = \Psi_f [x_0^T \hat{z}^T]^T$
    else
        if left($z_0$)<right($z_0$) then
            $z_0$ =mirrorv($z_0$)
        end if
        if top($z_0$)<bottom($z_0$) then
            $z_0$ =mirrorh($z_0$)
        end if
        n $\leftarrow$ 1
        for $\tau$ = 1 to t do
            b $\leftarrow B_n z_0$ -continued Algorithm 1 $L^3$ Processing Pipeline

```
      if b < b_n then
          n ← 2n
      else
          n ← 2n + 1
      end if
  end for
  return x̂ = Ψ_{f,n} [x_0^T ẑ^T]^T
end if
```

TABLE 3.2

Computation required per pixel by $L^3$ pipeline.

| Stage | Multiply | Add/Subtract | Compare |
|---|---|---|---|
| Calculate overall color | hm | h(m − 1) | |
| Subtract overall color | | m | |
| Classify as flat/texture | | m − 1 | 1 |
| Canonical orientation | | 2p(m − √m − 2) | 2p |
| Hierarchical clustering | ptm | pt(m − 1) | pt |
| Filter with Ψ | o(m + h) | o(m + h − 1) | |
| Total | (h + o + pt)m | (h + o + (t + 2)p + 2)m | (t + 2)p + 1 |

Computational Complexity

The computational complexity of applying the $L^3$ pipeline is presented in Table 3.2. Recall that patches are $\sqrt{m} \times \sqrt{m}$ pixels, and the number of colorbands in the CFA and output color spaces are h and o, respectively. The fraction of patches that are classified as texture is p. The tree height for texture clustering, discussed in Appendix A is t. Most of the computations involve an inner product of two vectors that are of length m, which requires m multiplies and m−1 additions. The number of multiplies can be reduced if there is some symmetry in the filters such as can be enforced to the CFA and flat filters, however this is not assumed. Note m absolute values are also required to calculate the contrast when determining if a patch is flat or texture. For the canonical orientation, two axes of symmetry are assumed for the table although this may vary depending on the CFA. Terms that did not scale with m were omitted from the total count of multiplications and additions/subtractions in the table.

The global linear and $L^3$ pipelines can be modified to estimate the outputs for more than one pixel in each patch. For example, with a 10×10 patch, the output color space could be estimated at the center 2×2 pixels. This would result in the reduction by a factor of 4 in the number of patches that need to be calculated and an elimination of the need for multiple patch types. The resultant images should have a similar quality to filtering with the presented method using patches of 9×9 pixels because each of the four center pixels in the 10×10 patch are at least eight pixels away from the edge of the patch like in the 9×9 patch.

Learning on Constrained Sets

The $L^3$ pipeline can adapt to the specific statistics of the training images. The amount of improvement of a pipeline optimized for a particular application, as opposed to a general pipeline designed for a huge variety of scenes, can be very large. However, the improvement depends on the dataset. With increased constraints and predictability on the dataset, the larger the value in optimizing the pipeline.

For consumer cameras, the camera could attempt to automatically detect the type of scene or it could be directed by the user selecting a number of pre-defined scene modes. Scene modes currently implemented on many digital cameras include portrait, sunset, landscape, document, fireworks, beach, and snow. Filters can be optimized for each of these types of modes. There also are a number of scientific, industrial, or medical imaging devices that by design only image a single type of scene. The processing pipeline can be designed and optimized for the expected scenes instead of employing a general purpose pipeline that is designed for all types of photography.

To illustrate the potential of learning on constrained datasets for specific applications, consider the imaging of a document containing text. For general processing pipelines, images with text are challenging because edges are very sharp and small. When the edges are on the order of a couple pixels in width, all demosaicking algorithms for general images will introduce some color artifacts to the estimated image depending on how the edges lines up with the CFA.

Fundamentally, images of black text on white paper have only a single color channel similar to grayscale images. If the processing pipeline is aware that the estimated images should resemble grayscale, the demosaicking problem becomes trivial. The mosaic can be removed by scaling each of the measurement channels by a scalar to adjust for each channel's differing amount of the illuminant captured. No spatial interpolation is required except for denoising.

Figure 11:
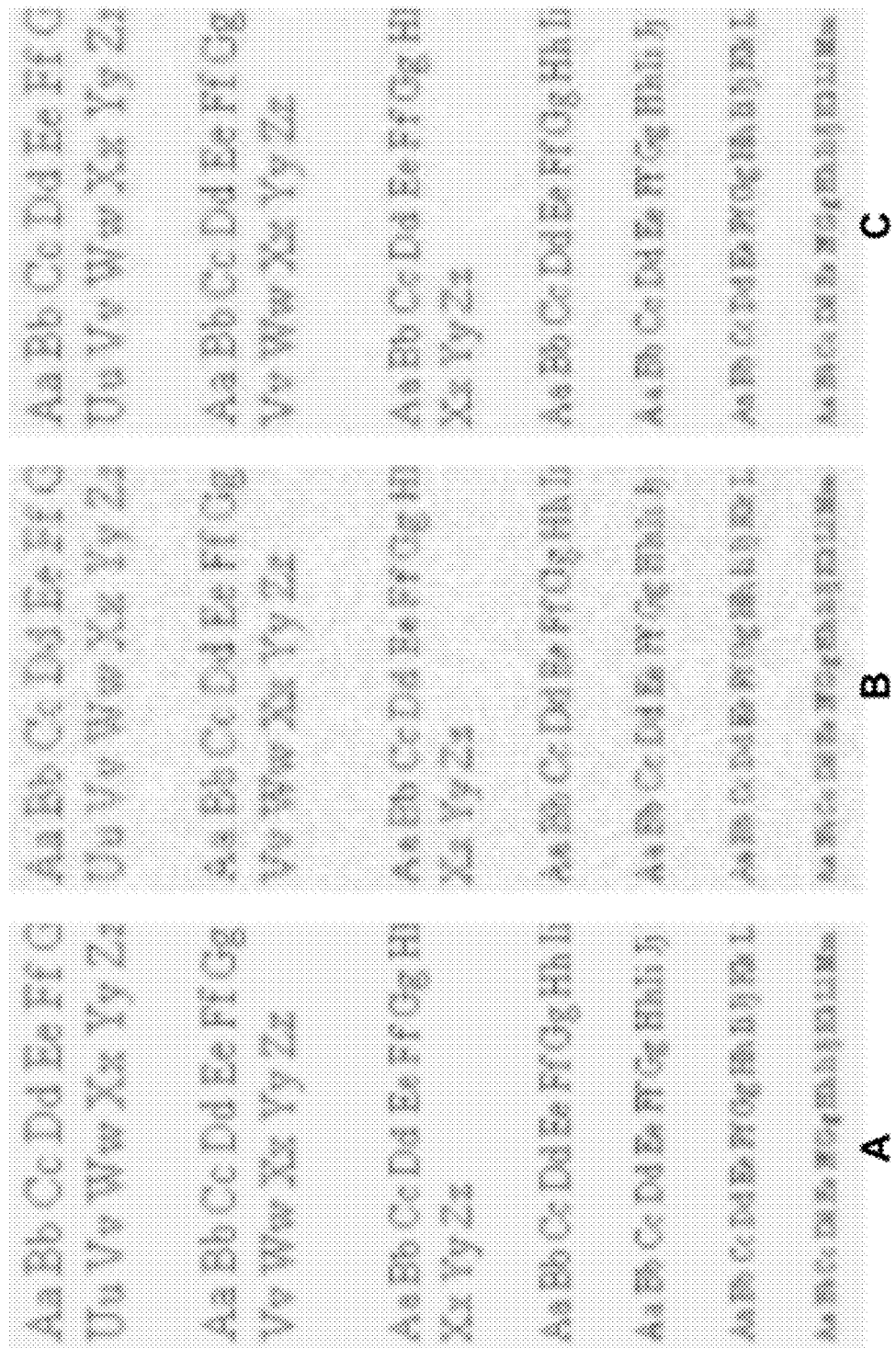
FIGS. 11A-C show according to exemplary embodiments of the invention $L^3$ learning of restricted images such as text. (A) Ideal image. (B, C) Reconstructions after sampling with Bayer pattern and processing with (B) basic pipeline and C) $L^3$ pipeline. Images are 250×135 pixels. The scene had a mean luminance of 200 cd/m².

FIGS. 11A-C compare an original text image and output from the basic and $L^3$ pipelines. The scene was generated by creating an image of text with software. The reflectance at each point of the scene was then set for all wavelengths to a constant that was given by the intensity in the image. The camera simulation then blurred the scene and created the sensor image. The $L^3$ pipeline was trained on four similar scenes that used different fonts. There are a large number of color artifacts in the image from the basic pipeline, which makes the text appear multicolored and difficult to read. The image from the $L^3$ pipeline is entirely grayscale because there were no colors in the training set. It is impossible for any color artifacts to appear in the $L^3$ images because the derived XYZ filters only differ by a scalar multiple. For these images, the flat filters are spread out as much as possible to reduce the noise in the white page. The texture filters are very centralized so as not to blur the edges. Normally the texture filters need to be a little more dispersed because they require measurements from other colorbands in order to estimate the color.

Extensions of $L^3$ Pipeline

The following examples extend the $L^3$ pipeline's ability to perform demosaicking, denoising, and color transform.

Deblurring

A common goal of image processing pipelines is to estimate images with well-defined edges since they may be more pleasing to consumers. Another way of describing this is to remove any blur caused by the optics or CFA through a process of deblurring. The $L^3$ pipeline can be adapted to automatically deblur an image by using sharp output images for training. The algorithm learns filters that can sharpen the blurred sensor images while simultaneously performing the demosaicking, denoising, and color transform.

Figure 12:
FIGS. 12A-C show according to exemplary embodiments of the invention how the $L^3$ pipeline can perform automatic deblurring. (A) Ideal image formed with diffraction-limited lens with f-number of 4. (B, C) Reconstructions after imaging with diffraction-limited lens with f-number of 32, sampling with Bayer pattern, and applying $L^3$ pipeline trained on input images from lens with f-number of 32 and output images from lens with f-number of (B) 32 and (C) 4. Images are 350×250 pixels.

FIGS. 12A-C illustrate deblurring performed by the $L^3$ pipeline. For a fixed focal distance, lenses with larger f-numbers have smaller apertures, which causes increased diffraction. Without sharpening, the image from a lens with f-number of 32 is very blurry as shown in FIG. 12B. The $L^3$ pipeline was trained with sensor measurements taken from these blurry images and output images taken from the sharp images formed by a lens with f-number of 4. Four similar scenes that used different fonts were chosen for training. The result of the pipeline is the much sharper image shown in FIG. 12C. Some letters that are not discernible in the blurred image can be made out in the processed image. The smallest letters are not as sharp since most of the information is lost in the blurring of the lens. Unfortunately deblurring generally is susceptible to noise, which is visible in the processed image. A large SNR of 40 dB was used for the measurements in these simulations.

Figure 13:
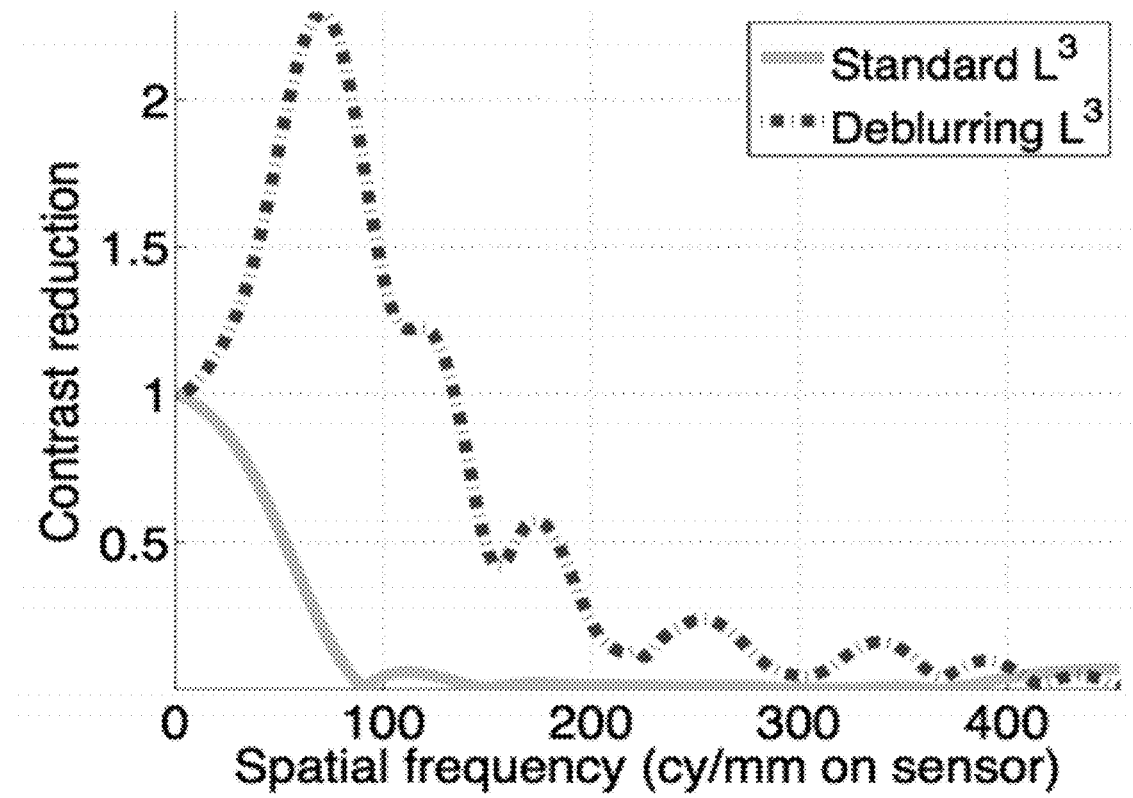
FIG. 13 shows according to an exemplary embodiment of the invention how the $L^3$ pipeline boosts spatial frequencies to deblur. MTF of luminance channel, Y, of estimated images after sampling with Bayer pattern using lens with f-number of 4 and $L^3$ pipelines used in FIG. 12.

To understand how deblurring is performed, MTFs of the system are presented in FIG. 13. The MTFs are of the $L^3$ pipeline used in FIG. 12 combined with the sharp lens with an f-number of 4. The standard $L^3$ pipeline optimized for the blurry image allows only low frequencies to pass through the system. This eliminates high frequency noise while preserving the low frequency terms that make up the blurry image. The deblurring $L^3$ pipeline preserves the DC term while boosting low and medium frequencies. This counteracts the attenuation of these frequencies by the blurry lens. The high frequency terms below the Nyquist rate of 227 cycles/mm are passed through the system but not boosted due to the risk of enhancing the noise.

With the $L^3$ pipeline's ability to deblur, it is possible to image with a cheaper lens that has more aberrations and correct the errors by processing to achieve images of the same quality. Jointly optimizing the optics and processing could reduce the cost and weight of lenses or increase the quality of existing cameras.

Multispectral Estimation with Six-Channel CFA

Using a six-channel CFA such as in FIG. 1C, it is possible to estimate multispectral images from a single acquisition. The simulated camera adds cyan, magenta, and yellow filters to the previously described red, green, and blue filters. Generally one wants to know an object's reflectance instead of the spectral power distribution of the light from the scene. The spectral shape of the illuminant is continued to be assumed since this must be known or estimated before performing reflectance estimation.

Figure 14:
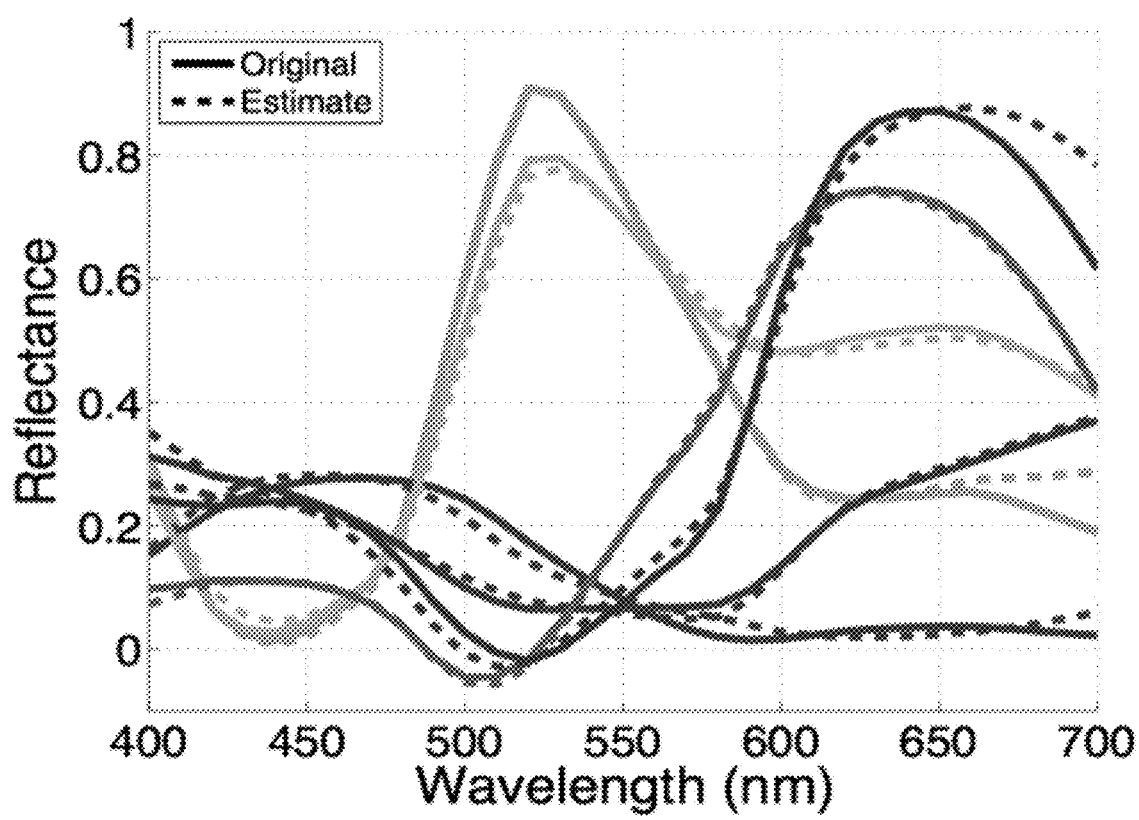
FIG. 14 shows according to an exemplary embodiment of the invention how the $L^3$ pipeline can perform reflectance estimation at each pixel. Estimation using principal components from simulated acquisition with a six-channel CFA of a scene containing multicolored beads with mean luminance of 5000 cd/m². Original and estimated reflectances represent averages over a number of pixels contained within a single bead. Curves with the same grey scale represent the same object.

Although the $L^3$ method can directly estimate each of the desired wavelength samples, this demands a large amount of computation and memory. Due to the smooth nature of reflectances, they can be well approximated using a few principal components. For the simulations here, the desired output space consists of six principal components, which offers a compact representation of reflectances. Since measurements of the reflectance are desired, the assumed illuminant is factored out before calculating the coefficients of the principal components when generating the desired output images for the training data. Once the coefficients of the principal components are estimated, the reflectance estimate is formed as a linear combination of the principal components using the coefficients. FIG. 14 shows the ideal and estimated reflectances from the $L^3$ pipeline.

Multispectral Object Detection

A common task in multispectral imaging is to detect or classify different objects based on their spectral components. Many objects that appear identical to a human observer under common illuminations may actually have different reflectances, which could be used to distinguish the objects in a computer vision application. There are naturally occurring examples of similar materials such as if a disease slightly alters the reflectance of a part of an organism. Camouflage is a man-made example of objects that appear similar but may differ spectrally.

Figure 15:
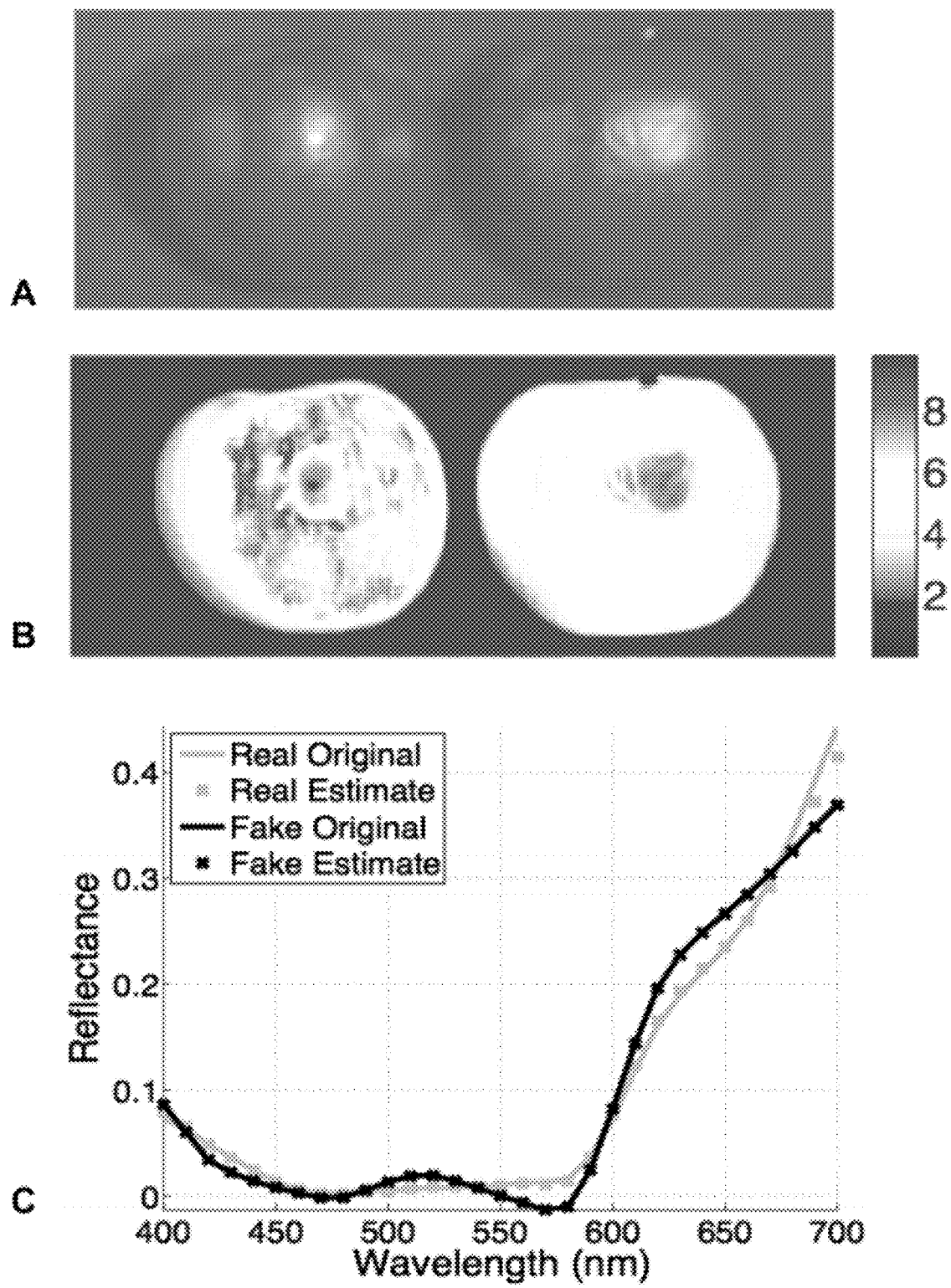
FIGS. 15A-C show according to exemplary embodiments of the invention how the $L^3$ pipeline can be applied to multispectral object detection. (A) Scene of real and fake apples shown in sRGB. C) Original and estimated reflectances after sampling with six-channel CFA and averaging over a small number of pixels in each apple. Training data was taken from the same scene due to a lack of similar scenes. Simulated mean scene luminance was 5,000 cd/m². (B) Similarity of the estimated reflectance to the target reflectance. The colors indicate the value of −log(1−d). Large values indicate similarity to the target reflectance of the real apple.

FIG. 15A shows a scene containing real and man-made apples. The two apples appear nearly identical in color due to their deliberately similar reflectances in the visible spectrum. If data were available in the infrared portion of the spectrum, 700-1100 nm, the apples may be very easily detected using a camera that can measure in these wavelengths because the reflectances need not be similar over that interval. By sampling with the six-channel CFA in the visible spectrum and using the $L^3$ pipeline, the reflectances can be estimated with great accuracy assuming the $L^3$ algorithm is trained specifically for this task.

To differentiate the real and fake apples, a distance measure is introduced to compare the estimated reflectances. Let $x_t \in R^o$ be a representative reflectance of the target object to be detected and $\hat{x} \in R^o$ be a reflectance estimate that is to be evaluated if it belongs to the desired object class where o is the number of wavelength samples used for the reflectance. Due to the difficulty of estimating the absolute intensity of the illuminant at each object in the scene, the distance measure is designed to be invariant to the overall height of the reflectances. The distance measure chosen is given by $$d = \frac{x_t^T \hat{x}}{|x_t|_2 |\hat{x}|_2}$$

where Euclidean norms are used in the denominator. Therefore, d is the cosine of the angle between the reflectance vectors in $R^o$. The maximum value of d=1 is achieved by reflectance estimates that have the same shape as the target reflectance. This value decreases as the shapes differ.

It is more efficient to calculate the distance using the six PCA coefficients instead of only the reflectance estimates. Since over 30 wavelength samples are generally used for multispectral imaging, the memory and computational requirements are reduced by working on the PCA coefficients. Let $\theta_t \in R^6$ be the first six PCA coefficients of the reflectance given by $\theta_t = P^T x_t$ where the columns of $P \in R^{o \times 6}$ are the PCA reflectance vectors. Since $x_t \approx P\theta_T$, the distance measure is approximated by $$d = \frac{\theta_t^T P^T P \hat{\theta}}{|P\theta_t|_2 |P\hat{\theta}|_2}.$$

This can be simplified as $$d = \frac{\theta_t^T \hat{\theta}}{|\theta_t|_2 |\hat{\theta}|_2},$$

because the columns of P are orthonormal meaning $P^T P$ is the identity.

FIG. 15B illustrates the similarity between the estimated reflectance and the target reflectance from the real apple. The real apple on the left is clearly distinguished from the fake apple on the right and can be selected by thresholding the image. The specular reflections from the surface of the apples are not detected because they have the spectral shape of the illuminant with no modulation by the apple's reflectance. Notice the distance measure yields relatively uniform values across the curved surface of the apple despite large changes in the brightness of the reflected light.

Conclusions

The local linear learned ($L^3$) algorithm learns how to cluster training data and for each cluster finds the linear filter that minimizes the error of the estimate over the training data. The approach has the advantage that it is fast, robust to noise, adapts to the particulars of a dataset, and generalizes to a large variety of problems.

The $L^3$ pipeline has the ability to process a noisy image from a camera sensor with any CFA design and simultaneously perform demosaicking, denoising, and color transform to estimate a high quality image in any output color space. Patches from the sensor image are classified as belonging to flat or texture regions. Texture patches are oriented into a canonical form and may be further subdivided. Then, the output estimate at the center of the patch is found by applying pre-computed Wiener filters that are based on the patch's cluster and the brightness of the scene. The Wiener filters are optimized for reducing noise while preserving the signal. The $L^3$ pipeline's ability to automatically perform illuminant correction and deblurring was presented herein.

The $L^3$ pipeline enables the use of new CFA designs, which are a promising technology due to the huge number of pixels on modern sensors. Illustrated examples include CFAs with white pixels for low light imaging and six-channel CFAs for multi-spectral imaging from a single photo. With software to perform camera simulations, the $L^3$ pipeline enables designers to rapidly test and improve new CFA designs. There is an exciting possibility of designing application specific sensors and processing pipelines that can leverage the particular properties of the scenes encountered by application-specific devices.

The $L^3$ approach can also be applied to estimating a reflectance given a few measurements of the light assuming a known illuminant. The $L^3$ estimator has nearly optimal performance, which is limited by the amount of noise and variation of the reflectances in the dataset. For low noise and constrained datasets that are common in specific applications, the $L^3$ algorithm offers significant improvement over the global linear estimator while offering fast computation. The global Wiener filter and $L^3$ algorithm both take the noise into account when forming the estimate, which is critical for measurements with spectral sensitivities that overlap.

Extensions of $L^3$ Pipeline

Although images from the $L^3$ pipeline are generally of high quality, their visual appeal may be improved for noisy scenes through post-processing. Currently the output value for each pixel is independently estimated with the goal of maximizing MSE or PSNR. This approach ensures the pipeline has minimal computational requirements and can be processed in parallel. A post-processing step that further smoothes estimated values in flat regions may decrease the PSNR but make the image more pleasant for the human visual system by eliminating any noise that still exists in regions that should have little texture.

The following are possible applications of the $L^3$ pipeline that might be achieved by redesigning patch clustering and/or the desired output image.

Dead pixel correction—Cluster to detect dead pixels by checking if the measurement at patch's center pixel differs greatly from the overall color estimate. The cluster's filters will be specifically optimized to estimate without using the dead pixel's measurement.

Adapt to pixel saturation—If a pixel saturates due to being exposed to too much light, the measurement is useless. Nearby pixels of the same color will probably also saturate. A cluster could be made that detects the saturation of a channel and performs the estimation without the measurements from the saturated pixels.

Improved spectral estimation—Currently the overall color in a patch is ignored when clustering because it is not helpful for general imaging. For datasets from more specific applications, the color may be very meaningful. Clustering could be based on the overall color so clusters contain only patches with similar color. If the patch's overall color has a strong correlation with spatial features for a dataset, estimation may significantly improve.

High dynamic range imaging—Currently images are processed based on the mean scene luminance. This allows high and low light images to be processed well, but performs poorly for images with both high and low light regions. Instead the processing could be based on local light levels, which would enable improved processing of high dynamic range scenes.

Optical correction—By considering the optical system when processing, it is possible to correct aberrations by training to an image captured using superior optics. Clusters could be designed for different spatial parts of the image where there may exist different geometric or chromatic errors due to lens aberrations.

Object classification or detection—Cluster labeled training data in CFA space to try to separate different objects of interest such as with support vector machines. The likelihood of a test patch belonging to a certain object of interest is predicted by the percent of the training data in the same cluster that are from that object. This allows classification and identification based on the raw sensor data instead of estimated output images that are larger but contain no additional information.

Illuminant estimation using skin—The shape of the reflectance of skin is relatively invariant across humans. With automatic detection of faces, the light reflected from the skin can be measured. The chromaticity of the skin region can then be used to estimate the scene's most likely illuminant by leveraging labeled training data.

Estimation from multiple images—Multiple images are automatically taken by the camera in fast succession and then processed into a single image. Examples include images taken with identical settings for improved SNR, multiple shutter speeds for high dynamic range imaging, and multiple focus points for all focus imaging. Patches would need to be extended to three dimensions by including measurements from each of the images.

User-defined custom processing—By observing how a camera user edits photos, the processing pipeline could be adjusted to automatically make similar adjustments. For example, if the color of the sky is always made more saturated or red eye is always removed, a cluster could be learned for the relevant patches. The filters for the cluster could be optimized using the adjustments the user has made.

APPENDIX A

Clustering of Texture Patches

Using a single texture cluster, it is not possible to determine whether an edge is straight or curved, sharp or soft, or texture without any particular edges. By subdividing texture patches and learning optimal filters for each cluster, the $L^3$ pipeline can become more adaptive to particular features in the sensor images. For example, with a cluster only for corners, the filters can be optimized to detect corners and generate them in the estimated image. Although there are interesting applications made possible by adjusting the clustering for specific tasks such as mentioned in the conclusion section, clustering as described in this section could achieve improved estimation accuracy for the current simulation setup.

There are a number of important requirements for the clustering process. First, all patches in a cluster should be similar enough so that a single linear filter may exist that can offer reliable estimation. Of course this is not a sufficient requirement for clustering because it is satisfied by having a huge number of clusters so that the filtering is very adaptive. But the required amount of training data scales with the number of clusters in order to avoid overfitting the data. Trying to limit the number of clusters also keeps memory and computation requirements at a reasonable level. There is less risk of misidentifying a patch's cluster due to noise when there are a smaller number of clusters. Finally, the procedure for identifying a patch's cluster needs to require minimal computation since it is performed on all texture patches.

For minimal computation, a top-down hierarchical clustering method could be employed. Initially all oriented residual texture patches are in a single cluster. Then, the cluster is split into two clusters of approximately equal size. The splitting continues until the desired number of clusters is achieved. For simplicity, all branches of the tree terminate at the same level, however it may be advantageous to only subdivide the clusters with high errors.

The advantage of the tree approach is that a patch's cluster can be identified out of $2^t$ possible leaf clusters by requiring only t branching decisions. The number of branching decisions required to reach one of the leafs will be referred to as the tree height. For speed and simplicity, the branching operation is restricted to the calculation of an inner product between the patch and a pre-determined filter, called the texture branching filter. The patch is placed into one of the two smaller clusters by comparing the inner product to a pre-determined threshold, called the texture branching threshold.

To reduce the variation among the patches in each of the smaller clusters, the texture branching filter is the first PCA vector of the patches in the cluster. This vector is in the direction of maximum variation among the patches. The two resultant clusters each have a smaller variation in this direction than the parent cluster. The use of PCA is also motivated by the fact that it is the continuous solution of the cluster assignment vector for the K-means cluster objective for two clusters. This continuous variant of K-means clustering may be more appropriate here because points near the boundary between the two clusters risk being misclassified due to noise. The chosen texture branching threshold is the mean value of the first PCA component of all patches in the original cluster. This results in an approximately equal number of patches in each of the smaller clusters.

Embodiments of the invention can be practiced as part of an image processor, an image processing method or a system for learning and/or processing images. The methods can be implemented as computer-implemented modules executable by a computer processor or device. The methods can also be stored on machine-readable media or as executable code on storage medium. Some aspects of the invention can also be programmed or stored on a computer chip and executable by computer hardware.

What is claimed is:

1. An image processor for processing an input image to an output image, comprising:
   (a) an image input device for reading an input image, wherein said input image has a color filter array (CFA) mosaic structure;
   (b) a storage device for containing a set of learned regression coefficients for a predefined estimation function for estimating output colorbands at image pixels, wherein each of said set of said learned regression coefficients is defined for a collection of nearby pixels for each of said image pixels; and
   (c) a pixel processing module for processing each of the pixels of said input image, wherein said pixel processor:
   (i) obtains said collection of nearby pixels for each of said pixels in said input image,
   (ii) selects learned regression coefficients from said stored learned regression coefficients based on the position of said pixel in said color filter array mosaic structure and a calculation using said collection of nearby pixels in said input image, and
   (iii) applies said learned regression coefficients and said predefined estimation function to said pixels in said input image, thereby processing said input image to an output image,
   wherein said output image contains for each pixel values for a specified number of colorbands, which are different or the same in number or spectral sensitivity from said colorbands of said input image.

2. The image processor as set forth in claim 1, wherein said learned regression coefficients are obtained from a learning process comprising a learning regression method using a set of training images comprising pairs of input and desired output images.

3. The image processor as set forth in claim 2, wherein said learned regression coefficients are obtained using a Wiener filter.

4. The image processor as set forth in claim 1, wherein said estimation function is a linear function and learned regression coefficients represent an optimal convolution filter for the respective collection of nearby pixels for each of said image pixels.

5. The image processor as set forth in claim 1, wherein said pixel processor module, before applying said predefined estimation function, comprises a module for reordering said collection of nearby pixels in said input image based on values of said pixels in said input image.

6. The image processor as set forth in claim 5, wherein said reordering module comprises a module for implementing rotating and/or mirroring of values of said pixels in said input image.

7. The image processor as set forth in claim 1, wherein said selection of stored learned regression coefficients is determined by calculation of luminance, noise level, degree of aberration, position in image, amount of saturation, presence of erroneous pixels, amount of contrast, average value in each colorband, or any combination thereof.

8. An image processor for processing an input image to an output image, comprising:
   (a) an image input device for reading an input image, wherein said input image has a color filter array (CFA) mosaic structure;
   (b) a storage device for containing a set of learned regression coefficients for a predefined estimation function for estimating output colorbands at image pixels, wherein each of said set of said learned regression coefficients is defined for a primary collection of nearby pixels for each of said image pixels; and
   (c) a pixel processing module for processing each of said pixels of said input image, wherein said pixel processor:
   (i) applies a set of predefined global filters to said input image,
   (ii) obtains said primary collection of nearby pixels of said input image for said pixel;
   (iii) selects learned regression coefficients from said stored learned regression coefficients based on the position of said pixel in said color filter array mosaic structure and a secondary collection of nearby pixels from the result of applying said global filters; and (iv) applies said learned regression coefficients and said predefined estimation function to said pixels, thereby processing said input image to an output image, wherein said output image contains for each pixel values for a specified number of colorbands, which are different or the same in number or spectral sensitivity from said colorbands of said input image.

9. The image processor as set forth in claim 8, wherein said learned regression coefficients are obtained from a learning process comprising a learning regression method using a set of training images comprising pairs of input and desired output images.

10. The image processor as set forth in claim 8, wherein said learned regression coefficients are obtained using a Wiener filter.

11. The image processor as set forth in claim 8, wherein said estimation function is a linear function and learned regression coefficients represent an optimal convolution filter for said respective primary collection of nearby pixels for each of said image pixels.

12. The image processor as set forth in claim 8, wherein said pixel processor module, before applying said predefined estimation function, comprises a module for reordering said primary collection of nearby pixels in said input image based on values of said pixels in said input image.

13. The image processor as set forth in claim 12, wherein said reordering module comprises a module for implementing rotating and/or mirroring of values of said pixels in said input image.

14. The image processor as set forth in claim 8, wherein said predefined global filters are based on a calculation of luminance, noise level, degree of aberration, position in image, amount of saturation, presence of erroneous pixels, amount of contrast, average value in each colorband, or any combination thereof.

15. An image processor for processing an input image to an output image, comprising:
  (a) an image input device for reading an input image;
  (b) a storage device for containing a set of learned regression coefficients for a predefined estimation function for estimating output colorbands at image pixels of said input image, wherein each of said set of said learned regression coefficients is defined for a collection of nearby pixels for each of said image pixels; and
  (c) a pixel processor module for processing each of said pixels of said input image, wherein said pixel processor obtains said collection of nearby pixels for said pixel, and wherein said pixel processor:
    (i) reorders said collection of nearby pixels;
    (ii) selects learned regression coefficients from said stored learned regression coefficients based on said reordered collection of said nearby pixels; and
    (iii) applies said learned regression coefficients and said estimation function to said pixels, thereby processing said input image to an output image, wherein said estimated colorbands at said output image pixels are different or the same in number or spectral sensitivity from said colorbands of said input image.

16. The image processor as set forth in claim 15, wherein said learned regression coefficients are obtained from a learning process comprising a learning regression method using a set of training images comprising pairs of input and desired output images.

17. The image processor as set forth in claim 15, wherein said learned regression coefficients are obtained using a Wiener filter.

18. The image processor as set forth in claim 15, wherein said estimation function is a linear function and learned regression coefficients represent an optimal convolution filter for the respective collection of nearby pixels for each of said image pixels.

19. The image processor as set forth in claim 15, wherein said reordering module comprises a module for implementing rotating and/or mirroring of values of said pixels in said input image.

20. The image processor as set forth in claim 15, wherein said selection of stored learned regression coefficients is determined by calculation of luminance, noise level, degree of aberration, position in image, amount of saturation, presence of erroneous pixels, amount of contrast, average value in each colorband, or any combination thereof.

* * * * *